United States Patent
Worth

(10) Patent No.: US 12,443,881 B1
(45) Date of Patent: Oct. 14, 2025

(54) APPARATUS AND METHODS TO PROVIDE A LEARNING AGENT WITH IMPROVED COMPUTATIONAL APPLICATIONS IN COMPLEX REAL-WORLD ENVIRONMENTS USING MACHINE LEARNING

(71) Applicant: Substrate Artificial Intelligence SA, Madrid (ES)

(72) Inventor: James Brennan Worth, Castellón de la Plana (ES)

(73) Assignee: Substrate Artificial Intelligence SA, Madrid (ES)

(*) Notice: Subject to any disclaimer, the term of this patent is extended or adjusted under 35 U.S.C. 154(b) by 590 days.

(21) Appl. No.: 17/902,455

(22) Filed: Sep. 2, 2022

Related U.S. Application Data

(60) Provisional application No. 63/240,022, filed on Sep. 2, 2021.

(51) Int. Cl.
    *G06F 16/00*      (2019.01)
    *G06N 20/00*      (2019.01)

(52) U.S. Cl.
    CPC ................... *G06N 20/00* (2019.01)

(58) Field of Classification Search
    CPC ...................................................... G06N 20/00
    See application file for complete search history.

(56) References Cited

U.S. PATENT DOCUMENTS

| | | | |
|---|---|---|---|
| 9,959,507 B2 | 5/2018 | Mathur et al. | |
| 10,354,342 B2 | 7/2019 | Kuper et al. | |
| 11,734,614 B1 | 8/2023 | Wang et al. | |
| 11,763,154 B1 | 9/2023 | Lupesko et al. | |
| 11,889,819 B2 | 2/2024 | Worth | |
| 12,156,512 B2 | 12/2024 | Worth | |
| 12,304,081 B2 * | 5/2025 | Kuo | G06N 3/08 |
| 2002/0004098 A1 | 1/2002 | Dahlen et al. | |
| 2014/0116341 A1 | 5/2014 | Kopic et al. | |
| 2016/0007565 A1 | 1/2016 | Trottier et al. | |
| 2016/0324126 A1 | 11/2016 | Johnston et al. | |

(Continued)

OTHER PUBLICATIONS

Baumeister, R. F. et al., "Do Conscious Thoughts Cause Behavior?," Annu. Rev. Psychol., 2011. vol. 62, pp. 331-361.

(Continued)

*Primary Examiner* — Noosha Arjomandi
(74) *Attorney, Agent, or Firm* — COOLEY LLP

(57) ABSTRACT

Embodiments disclosed include a method comprising building a machine learning (ML) model that includes a digital agent configured to navigate a digital environment, implementing a navigation of the digital agent over a period of time and following a path within the digital environment, that includes a set of states. Upon reaching each state, the digital agent is configured to acquire the value associated with that state. The method includes determining a signal representing an acquisition of values by the digital agent over the period of time, computing an emotive state of the digital agent and an arousal state of the digital agent based on the signal representing the acquisition of values, and determining a goal for the digital agent to achieve an improved overall performance in acquiring cumulative rewards. The method includes implementing a real version of an action of the digital agent in a real environment.

22 Claims, 11 Drawing Sheets

(56) References Cited

U.S. PATENT DOCUMENTS

| | | |
|---|---|---|
| 2019/0114078 A1 | 4/2019 | Oh |
| 2019/0371426 A1 | 12/2019 | Embree et al. |
| 2020/0113158 A1 | 4/2020 | Rishi et al. |
| 2020/0169400 A1* | 5/2020 | Thaler, III .............. G06F 21/62 |
| 2020/0176088 A1 | 6/2020 | Kanamarlapudi et al. |
| 2020/0194126 A1 | 6/2020 | Lim et al. |
| 2020/0279025 A1 | 9/2020 | Owen |
| 2020/0332013 A1 | 10/2020 | Weber et al. |
| 2022/0083445 A1 | 3/2022 | Nyati et al. |
| 2022/0114495 A1 | 4/2022 | Nurvitadhi et al. |
| 2022/0284352 A1 | 9/2022 | Chang et al. |
| 2023/0032822 A1 | 2/2023 | Wang et al. |
| 2023/0098374 A1 | 3/2023 | Worth |
| 2023/0101777 A1 | 3/2023 | Worth |
| 2023/0103420 A1 | 4/2023 | Worth |
| 2023/0123322 A1* | 4/2023 | Cella ................... G06Q 10/067 700/29 |
| 2023/0214925 A1* | 7/2023 | Cella .................... G06Q 30/06 705/37 |
| 2024/0028948 A1* | 1/2024 | Worth ................... G06N 3/008 |
| 2024/0127062 A1* | 4/2024 | Muller .................... G06N 3/08 |
| 2024/0177216 A1* | 5/2024 | Xiong ............... G06Q 30/0218 |
| 2024/0224944 A1 | 7/2024 | Worth |
| 2024/0289639 A1* | 8/2024 | Worth ................... G06N 3/006 |
| 2024/0310860 A1* | 9/2024 | Van De Velde ....... G01C 21/20 |
| 2024/0320444 A1* | 9/2024 | Maschmeyer ...... G06F 3/04845 |
| 2024/0394556 A1* | 11/2024 | Shao ................... G06N 3/0985 |
| 2024/0427321 A1* | 12/2024 | Gupta ............... G05B 13/0265 |
| 2025/0111280 A1* | 4/2025 | Li ......................... G06N 20/00 |

OTHER PUBLICATIONS

Bechara, A. et al., "Emotion, Decision Making and the Orbitofrontal Cortex," Cerebral Cortex, Mar. 2000, vol. 10, Issue 3, pp. 295-307.

Bhatt, S., "Reinforcement learning 101," Mar. 2018, [online], Retrieved from the Internet: https://towardsdatascience.com/reinforcement-learning-101-e24b50e1d292 , 8 pages.

Borchers, M. R. et al., "Machine-learning-based calving prediction from activity, lying, and ruminating behaviors in dairy cattle," J. Dairy Sci., Jul. 2017, vol. 100, No. 7, pp. 5664-5674.

Chica, A. B. et al., "Attentional Routes to Conscious Perception," Frontiers in Psychology, Jan. 2012, vol. 3, Article 1, pp. 1-12.

Chun, M. M. et al., "Memory: Enduring traces of perceptual and reflective attention," Neuron, Nov. 2011, vol. 72, No. 4, pp. 520-535.

Egger, D. J. et al., "Credit Risk Analysis Using Quantum Computers," IEEE Transactions on Computers, Dec. 2021. Vol. 70, No. 12, pp. 2136-2145.

Flet-Berliac, Y., "The Promise of Hierarchical Reinforcement Learning," The Gradient, Mar. 2019, 30 pages.

Fukuda, K. et al., "Quantity, not quality: The relationship between fluid intelligence and working memory capacity," Psychonomic Bulletin & Review, 17(5):673-679 (Oct. 2010).

Girard, N., "Characterizing strategic patterns of farms with knowledge-based temporal abstraction: The case of suckler sheep farms," AI Applications, 1996, vol. 10, No. 3, pp. 41-55.

Huang, J. et al., "Hyperparameter Auto-tuning in Self-Supervised Robotic Learning," IEEE Robotics and Automation Letters (RAL), Mar. 2021, presented at ICRA 2021 and NeurIPS 2020 DRL Workshop, 8 pages.

Kebreab, E. et al., "A new modeling environment for integrated dairy system management," Animal Frontiers, Apr. 2019, vol. 9, No. 2, pp. 25-32.

Koziol, L. F. et al., "Consensus Paper: The Cerebellum's Role in Movement and Cognition," Cerebellum, Feb. 2014, vol. 13, No. 1, pp. 151-177.

Liakos, K. G. et al., "Machine Learning in Agriculture: A Review," Sensors, 2018, vol. 18, No. 2674, 29 pages.

Liebe, D. M. et al., "Analytics in sustainable precision animal nutrition," Animal Frontiers, Apr. 2019, vol. 9, Issue 2, pp. 16-24.

Liessner, R. et al., "Hyperparameter Optimization for Deep Reinforcement Learning in Vehicle Energy Management," In Proceedings of the 11th International Conference on Agents and Artificial Intelligence (ICAART 2019), pp. 134-144.

Lockwood, O. et al., "Reinforcement Learning with Quantum Variational Circuits," Proceedings of the Sixteenth AAAI Conference on Artificial Intelligence and Interactive Digital Entertainment (AIIDE-20), 2020, pp. 245-251.

Marchetti, G. "Against the view that consciousness and attention are fully dissociable," Frontiers in Psychology, Feb. 2012, vol. 3, Article 36, pp. 1-14.

McCabe, D. P. et al., "The Relationship Between Working Memory Capacity and Executive Functioning: Evidence for a Common Executive Attention Construct," Neuropsychology, vol. 24, No. 2, pp. 222-243 (Mar. 2010).

McKnight, L. et al., "Modeling of livestock systems to enhance efficiency," Animal Frontiers, vol. 9, Issue 2, pp. 3-5 (Apr. 2019).

Morota, G. et al., "Big Data Analytics and Precision Animal Agriculture Symposium: Machine learning and data mining advance predictive big data analysis in precision animal agriculture," J. Anim. Sci., 2018, vol. 96, pp. 1540-1550.

Muzzio, I. A. et al., "What is remembered? Role of attention on the encoding and retrieval of hippocampal representations," J Physiol., Jun. 15, 2009, vol. 15, No. 587(Pt 12), pp. 2837-2854.

Neary, P. L., "Automatic Hyperparameter Tuning in Deep Convolutional Neural Networks Asynchronous Reinforcement Learning," 2018 IEEE International Conference on Cognitive Computing (ICCC), Jul. 2018, 5 pages.

NIPS 2007 Workshop, Hierarchical Organization of Behavior, 2007, 12 pages.

Non-Final Office Action for U.S. Appl. No. 17/488,706 dated Jun. 12, 2023, 17 pages.

Rebentrost, P. et al., "Quantum computational finance: quantum algorithm for portfolio optimization," [Online], Nov. 2018, 818 pages, Retrieved from the Internet: URL: arXiv:1811.03975.

Stamatopoulos, N. et al., "Option Pricing using Quantum Computers," [Online], Feb. 18, 2020, pp. 1-20, Retrieved from the Internet: URL: arXiv:1905.02666.

Suparwito, H. et al., "A Hierarchical Classification Method Used to Classify Livestock Behaviour from Sensor Data," In: R. Chamchong and K. W. Wong (Eds.): MIWAI 2019, LNAI 11909, Springer Nature Switzerland AG 2019, pp. 204-215.

Sutton, R. S. et al., "Between MDPs and semi-MDPs: A framework for temporal abstraction in reinforcement learning," Artificial Intelligence, 1999, vol. 112, pp. 181-211.

Sutton, R. S. et al., "Reinforcement Learning: An Introduction," Second Edition, in progress, A Bradford Book, The MIT Press, Cambridge, Massachusetts, 2014, 352 pages.

Valletta, J. J. et al., "Applications of machine learning in animal behaviour studies," Animal Behavior, 2017, vol. 124, pp. 203-220.

Wanga, H. P. et al., "Designing a machine learning—based framework for enhancing performance of livestock mobile application system," American Journal of Software Engineering and Applications, Apr. 2015, vol. 4, No. 3, pp. 56-64.

\* cited by examiner

APPARATUS AND METHODS TO PROVIDE A LEARNING AGENT WITH IMPROVED COMPUTATIONAL APPLICATIONS IN COMPLEX REAL-WORLD ENVIRONMENTS USING MACHINE LEARNING

CROSS-REFERENCE TO RELATED APPLICATIONS

This application claims priority to and the benefit of U.S. Provisional App. No. 63/240,022, filed on Sep. 2, 2021 and titled "APPARATUS AND METHODS FOR INTEGRATED MULTI-MODEL STRATEGY LEARNING AGENT ARCHITECTURE WITH AFFECT GUIDED BEHAVIOR," which is incorporated herein by reference in its entirety for all purposes.

BACKGROUND

Neuroscience and machine learning can include using understanding of the biological basis of decision making in complex environments. Facilitated by advances in sensing and computing power, the past several decades have realized tremendous progress in understanding of the molecular and functional aspects of brain and mind. However, even given these results there exists gaps in understanding of complex methods of decision making and in the development of a single, testable model of cognition or rule-based reasoning that can be used to improve computational applications.

Accordingly, a need exists for apparatus and methods for improved machine learning models to implement learning agents that can perform actions that lead to improved results in achieving desired goals.

SUMMARY

Embodiments disclosed include a method comprising building a machine learning (ML) model that includes a digital agent configured to navigate a digital environment. The method incudes implementing a navigation of the digital agent over a period of time and following a path within the digital environment. The path includes a set of states and each state from the set of states is associated with a value from a set of values. Upon reaching each state, the digital agent is configured to acquire the value associated with that state. The method further includes determining a signal representing an acquisition of values by the digital agent over the period of time. The method includes computing an emotive state of the digital agent based on the signal representing the acquisition of values, and computing an arousal state of the digital agent based on the signal representing the acquisition of values. The method includes determining a goal for the digital agent based on at least one of the emotive state or the arousal state of the digital agent. The goal is such that the digital agent achieves an improved overall performance in acquiring cumulative rewards when the digital agent takes actions to navigate towards the goal compared to when the digital agent does not take actions to navigate towards the goal. The method further includes receiving an indication of action taken by the digital agent in the digital environment and implementing a real version of the action in a real environment, the digital environment being associated with the real environment.

DETAILED DESCRIPTION

Figure 1A:
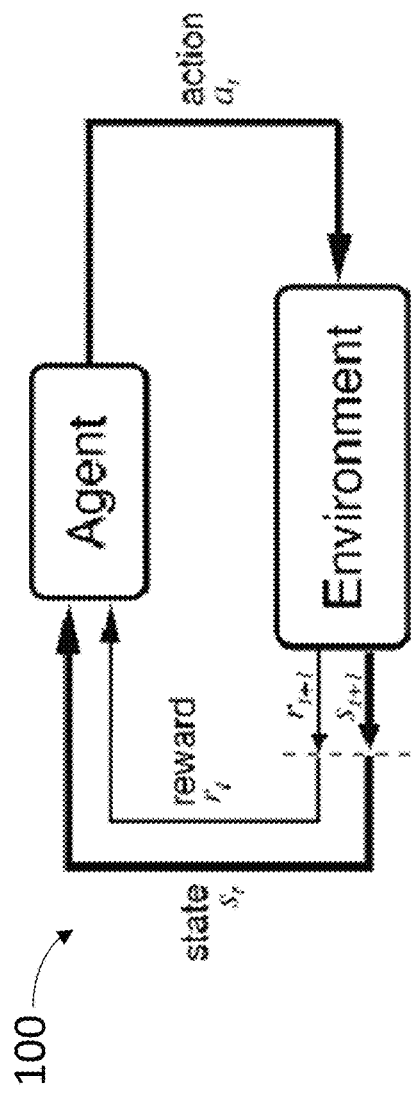
FIG. 1A is a schematic illustration of an implementation of an agent capable of general intelligence, using a suitable agent architecture, according to an embodiment.

In some embodiments, a biologically inspired agent architecture uses a hierarchical agent architecture supporting general adaptive multi-task learning and execution. The agent architecture combines executive style imagination and behavior composition through adaptive lookahead and synthetic experience generation. A motivation-based multi-task learning algorithm combines sub-goal selection, self-attention and behavior regulation that improves agent cumulative rewards while reducing execution of risky behavior. To support non-stationary and novel environments the agent architecture includes a Reinforcement Learning (RL) hyper-parameter auto-tuning and Options discovery capability. Results show that agents using this architecture outperform standard Q-Learning agents with an average increase of 87% of profitability and an excess of 400% improvement in drawdown in financial trading tasks Disclosed herein is a machine learning agent architecture. Some concepts implemented by the machine learning agent architecture include self-attention, goal learning, working memory, affective regulation, and skill learning. This work builds on a proof of principle agent that implements these ideas to verify its advantage over some known Q-Learning approaches. The machine learning models disclosed herein successfully demonstrated the core elements of the proposed system.

In some embodiments, design and generation of agents configured to be capable of general intelligence (e.g., navigate complex environments, solve complex problems, etc.) can benefit from drawing insights from biological organisms (also referred to herein as biological systems or biological agents), some of which have evolved to implement general intelligence to navigate complex environments in the real-world for successful survival.

One of the problems faced by agents, biological and digital, is decision making when faced with rich and varied input and a variety or available choices, options, or paths of action that may lead to varied outcomes that may not necessary be immediately or easily apparent at the time of decision making. Biological agents are constantly bombarded by vast amounts of complex sensory data and numerous and potentially conflicting reward signals. To survive, evolution selected organisms that were able to procreate, mature and pass on their genes through their offspring. As organisms grew in size and complexity, control systems co-evolved to support these organisms. The better the control system, the higher the probability the organism would survive to pass on their genes to their progeny.

One way a biological organism can solve complex problems is through the reduction of the available choices, options, or paths, otherwise referred to as the state space in which the agent reasons. Through millions of years of evolution, biological organisms have developed numerous and extremely elegant solutions to this problem that can be seen across the biome. From single cell organisms to *Homo sapiens*, life discovered a similar and often conserved set of algorithms that enabled our diversely populated world to support its many competing organisms.

A question of neuroscience and machine learning research is the development of a grounded understanding of the cognitive processes and how these processes are related to the biological substrate and its potential for digitization. Facilitated by advances in sensing and computing power, the past several decades have realized tremendous progress in our understanding of the molecular and functional processes. However, even given these results there exists significant gaps in our understanding of such processes and distilling such processes into a single, testable model of cognition.

There is a need for systems and methods to generate and operate digital agents that are capable of general intelligence and are superior in their abilities in navigating a complex environment and solving complex problems.

In some embodiments, the methods, apparatus, and systems disclosed herein describe an agent architecture that integrates numerous concepts grounded in neuroscience and psychology. Some of these concepts include self-attention, goal learning, working memory, affective regulation, and skill learning. In some example implementations, described herein and used to test the proposed agent architecture, the tests successfully demonstrated the superior operation of some of the core elements of the proposed system in a financial trading test application.

Reinforcement Learning

Reinforcement Learning (RL) can be used to create and implement agents capable of general intelligence. RL is an area of machine learning that is related to the study and implementation of how intelligent agents ought to take actions in an environment in order to maximize and/or improve a predefined concept of cumulative reward. RL can be used to implement intelligent digital agents.

In some implementations, RL described herein offers some advantages in the form of not requiring labeled data for training and not needing sub-optimal actions to be explicitly identified and/or corrected. In some implementations, RL described herein can have a goal of finding a balance between exploration (of unknown areas in an environment that may potentially have higher or lower rewards) and exploitation (of current knowledge of the environment). In some embodiments, RL described herein can be implemented as partially supervised RL that combines the advantages of supervised and RL algorithms.

RL, as described herein, can be inspired by how humans and animals learn from interacting with the environment. RL can assume the agent is actively pursuing a fixed set of goals. As described herein and in some implementations, through exploring its action space, the agent can gradually learn the best and/or an improved strategy to maximize and/or improve the agent's utilities. RL, as described herein, can be described as a Markov Decision Process (MDP), with a tuple (S, A, Pa, R), where S is the set of states the agent can possess, A is the set of actions the agent can take, Pa is the probability of state transitions by taking action 'a' at state 's', defined as $Pa=P[s_{t+1}=s'-s_t=s, a_t=a]$, and R is the reward received from the environment. Similar to how biological organisms interact with the world, the digital agents generated using systems implementing RL as described herein, can learn how to create policies by optimizing and/or improving a reward signal produced by the environment, which can be suitably represented via the system. Through interacting with the environment over time (t), the agent can learn a policy π, that maximizes and/or improves the agent's future reward.

FIG. 1A is a schematic representation of an example system 100 implementing an agent using RL, according to an embodiment. The system 100 can be based on any suitable agent architecture that determines interactions between the agent and the environment, as described herein.

In some implementations, as shown in FIG. 1A, a system 100 uses one or more machine learning models (e.g., executed by a compute device) to generate an agent and using RL, configures the agent to take actions ($a_t$) in an environment. The system can use any suitable agent architecture to generate the agent and to determine agent behavior. The agent architecture can include one or more machine learning models.

In some implementations, the one or more models can be configured to receive suitable input (e.g., goals, rewards, policies, input from or representative of variables in the environment, internal inputs from the system, etc.) and generate outputs that can be used to determine agent behavior (e.g., agent's action) in the environment. The agent's action in the environment is then interpreted by the system into a reward ($r_t$) and a representation of the state ($s_t$), which are fed back to the agent. Following which, the agent can evaluate the inputs and determine another action ($a_{t+1}$) in the environment. The agent's action ($a_{t+1}$) then results in a reward ($r_{t+1}$) and a representation of the state ($s_{t+1}$) and so on. Based on the actions taken and/or performed, states reached, rewards received, and/or the like, the system can use any suitable optimization and/or improvement procedure to learn to improve behavior and take optimal and/or improved actions towards a desired goal. In some implementations, the optimization and/or improvement can be directed such that a cumulative reward is optimized and/or improved and/or the agent gets closer towards a predefined goal.

Figure 1B:
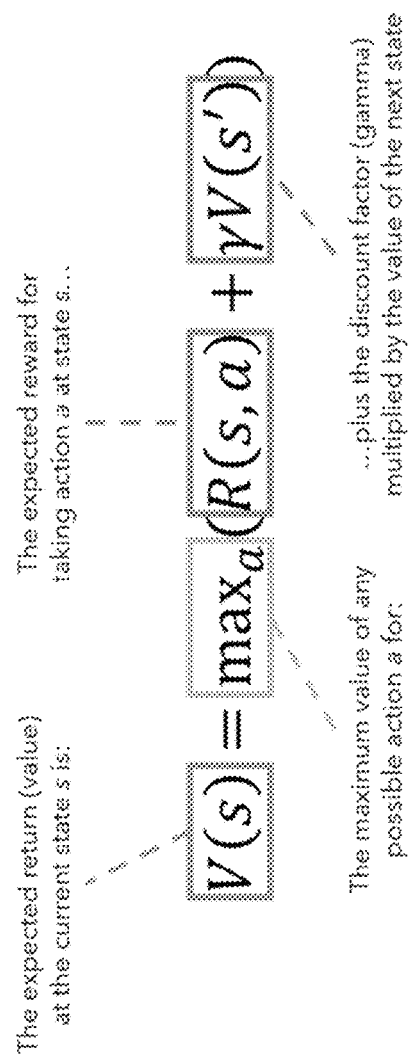
FIG. 1B is an equation representative of an algorithm used to implement an agent capable of general intelligence, using a suitable agent architecture, according to an embodiment.

In some implementations, as shown herein, through the use of the Bellman Optimization algorithm, agents can learn how to improve their behavior to maximize their future reward. FIG. 1B is an equation forming the basis of the optimization and/or improvement, according to some implementations of the systems and methods disclosed herein.

In some implementations, the models can use one or more of several RL models and/or algorithms to implement the agent. In some implementations, for example, a Q-learning model and/or algorithm can be used. The Q-learning model is a value-based model-free reinforcement learning model. The Q-learning model can seek to estimate the Q value, represented by state, action pairs of values. Each Q-value can be associated with a state(s) and an action (a) forming pairs of state-action values. Q-Learning can estimate the Q-value using temporal difference update: $Q(s_t, a_t)=r_t+\max a'Q(s',a')$.

Deep learning can be used with of RL models and/or algorithms. In some implementations, Q-learning implemented using deep network models (also referred to as Deep Q-Networks, DQN) can replace a Q-table with a neural network and can further improves the effectiveness of learning using experience replay. In some implementations, double DQN and dueling DQN can use separate neural networks to stabilize the weights of a neural network during training. In some implementations, a deep deterministic policy gradient (DDPG) model can extend Q learning to a continuous action space. In some implementations, a trust region policy optimization (TRPO) model and/or algorithm can improve the efficiency of Q learning by limiting the direction of the gradient descent process. In some implementations, a Proximal Policy Optimization (PPO) algorithm and/or model can further optimize and/or improve a TRPO model by providing an approximation function that runs faster than TRPG the majority of the time. In some implementations, a Hierarchical Reinforcement Learning (HRL) model and/or algorithm, as disclosed herein, solves long-horizon problems with little or sparse rewards. HRL can improve upon Q learning by enabling the agent to plan behaviors more efficiently while still learning low-level policies for execution. In one implementation, the agent architecture includes modules at a first level, for example, a high level within a hierarchy of models, that learn policies of high-level options execution, while a module at a second level, for example, a bottom-level within the hierarchy of models, learns policies to execute various options.

Agent Architecture

Creating and/or defining agents that can interact in complex real-world environments can be difficult in Reinforcement Learning (RL). Some known RL agents suffer significant performance issues when they are applied to real-world environments. This is because these environments contain a multiplicity of temporal and spatial scales that when processed simultaneously become computationally intractable. This has restricted the application of RL-based agents to limited domains and simple tasks.

In some implementations, the disclosed systems and methods integrate affective regulation, attention, goal learning, working memory and skill learning, building on a proof of principle agent that implements these ideas to verify its advantage over some known Q-learning approaches.

In some implementations, the systems and methods described herein include an agent architecture to implement RL that is inspired by the mammalian cognitive system and its affective decision system to create and/or define a primary learning model and/or algorithm that supports continual learning and contextually aware reasoning. In human psychology, affect/emotions play a role in our decision-making process. One reason for this is that emotions shape our various attentional and actuator systems by reducing the scope of reasoning performed by the agent. This improves the agent's performance in critical life/death scenarios, while allowing the agent to develop contextually aware strategies.

Disclosed herein is an agent architecture that uses a hierarchical RL model architecture that uses a computational model of affect (emotions) that guides agent behaviors across multiple domains and diverse tasks. Affect plays a role in adaptive behavior as seen in biology. In humans, affect has been demonstrated to play a critical function in decision making, where the absence of emotions leads to people being significantly impaired in this capacity. In addition to using affective control, the agent pulls inspiration from cortical layering and their associated subcortical connectivity.

In some embodiments, the described methods are inspired by the mammalian cognitive system and it's affective decision system to create and/or define a primary learning algorithm and/or model that supports continual learning and contextually aware reasoning. In some embodiments of the architecture disclosed herein, an integrated multi-task (IMT) model which can be a primary learning (PL) model includes a stack or set of hierarchical RL models that optimize and/or improve for various aspects of the attention, context, and restrictions that an experiential model included in the IMT model uses to generate an action. In the model stack, the context from a preceding model can be used to add to the decision process taking account of the agent's understanding of its current context. In addition to creating and/or defining the expanded state context, the actions from the PL model can set the experiential current subgoal, and can enable state features and actuators with which the agent can execute actions.

Additionally, the inspiration behind RL has represented a link between neuroscience and artificial intelligence (AI). For example, a dopamine system can explore introducing both internal and external rewards to the reinforcement learning process. In some embodiments of the architecture disclosed herein, systems and methods also seek to explore a neuroscience inspired RL model. For example, such models can be based on reward-based dynamic goal selection and limited attention and action affordance.

Some known RL algorithms assume the agent's goals are fixed, while people and animals constantly adjust the relative importance of their objectives even though their long-term goal may be maximizing and/or improving multiple and/or all the objectives. The relative importance of the objectives can be adjusted based on the circumstance and past successes/failures in achieving such objectives. In some embodiments, the systems and methods disclosed herein can mimic this phenomenon by representing the change of reward and the speed of change as the agent's state features, and can allow the agent to learn a subgoal through a separate RL process using its state and external rewards. The change of reward, and the speed of the change are named emotive and arousal, respectively, as they mimic the affective experience in goal-orientated behaviors in humans and animals. The subgoal works as an intrinsic reward to the agent and the external reward the agent receives from the environment.

Further, to improve learning speed, in some embodiments, the disclosed systems and methods implement an agent where a dynamically updated attention mask for the agent's states and affordance mask for the agent's actions, are applied. This mimics people's and animals' selective attention and the process of building mental models about the actions, i.e., when they are applicable and effective. This proposed approach is inspired by the fact that biological agents are constantly bombarded by vast amounts of complex sensory data and numerous and potentially conflicting reward signals. One way an organism can solve complex problems is through the reduction of the state space in which the agent needs to reason upon.

In one implementation, a model successfully demonstrated various elements of the proposed system in a mini (5×5) Go game environment. Testing of the agent showed significantly improved behavior with a diverse set of domains while reducing the execution of risky behavior over 400%, as compared to some known models.

Figure 2:
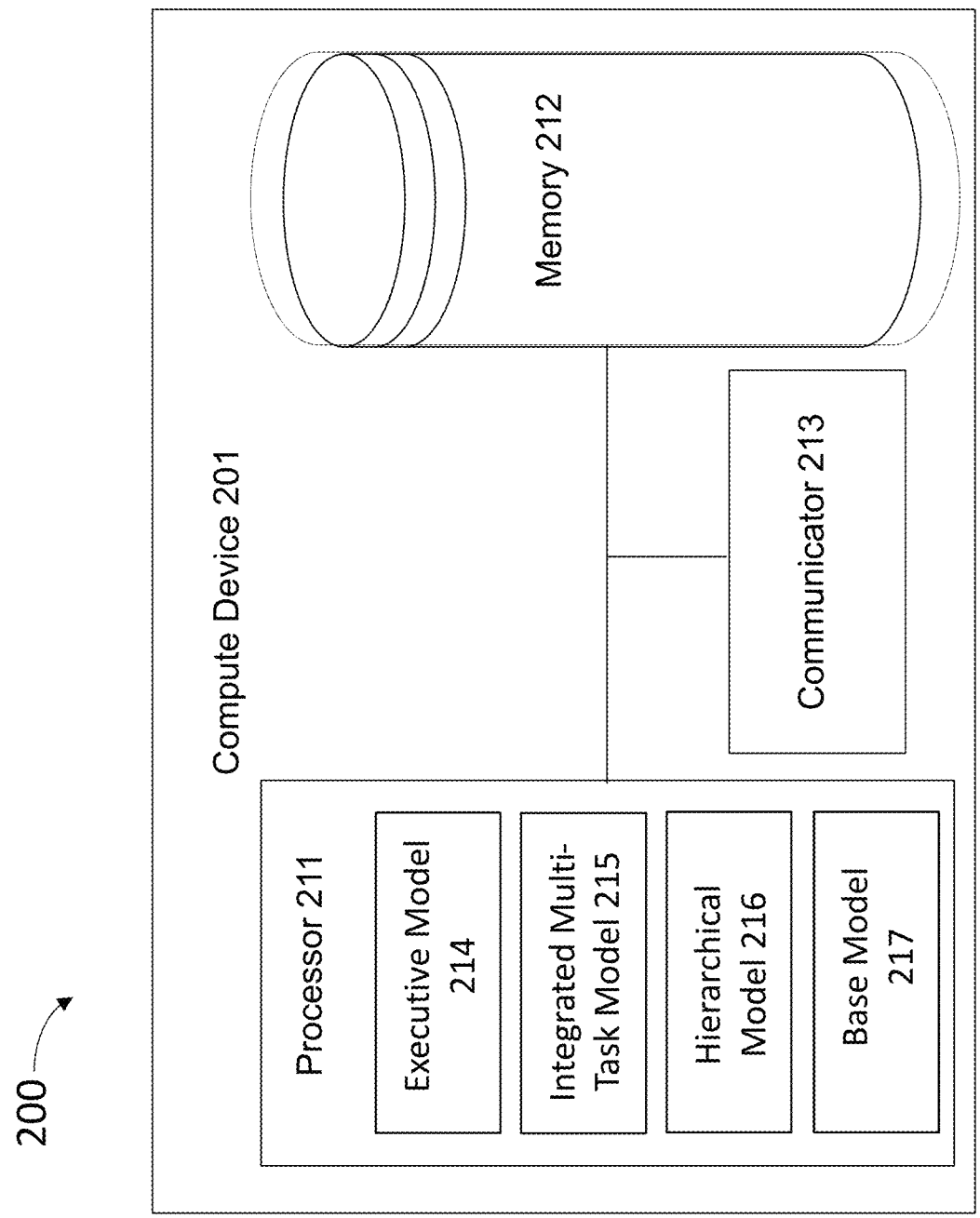
FIG. 2 is a schematic representation of a compute device configured to implement an agent architecture, according to an embodiment.

FIG. 2 is a schematic block diagram of an example system 200 that includes a compute device 201 that can be used to implement the agent architecture described herein, according to an embodiment. The system 200 can be substantially similar in structure and/or function not the systems 100, 300, 400, 500, 600, 700, and 800, described herein, with one or more models in the stack (e.g., executive model, integrated multi-task model, hierarchical model, base model, etc.) of the former being substantially similar to one or more models in the corresponding class level of the latter, respectively. The compute device 201 can be a hardware-based computing device and/or a multimedia device, such as, for example, a device, a desktop compute device, a smartphone, a tablet, a wearable device, a laptop and/or the like. The compute device 201 includes a processor 211, a memory 212 (e.g., including data storage), and a communicator 213.

The memory 212 of the compute device 201 can be, for example, a random-access memory (RAM), a memory buffer, a hard drive, a read-only memory (ROM), an erasable programmable read-only memory (EPROM), and/or the like. The memory 212 can be configured to store data processed and/or used by the executive model 214, the integrated multi-task model 215, the hierarchical model 216, and/or the base model 217. In some instances, the memory 212 can store, for example, one or more software programs and/or code that can include instructions to cause the processor 211 to perform one or more processes, functions, and/or the like (e.g., the executive model 214, the integrated multi-task model 215, the hierarchical model 216, and/or the base model 217). In some embodiments, the memory 212 can include extendable storage units that can be added and used incrementally. In some implementations, the memory 212 can be a portable memory (for example, a flash drive, a portable hard disk, and/or the like) that can be operatively coupled to the processor 211. In some instances, the memory can be remotely operatively coupled with the compute device. For example, a remote database device can serve as a memory and be operatively coupled to the compute device.

The communicator 213 can be a hardware device operatively coupled to the processor 211 and memory 212 and/or software stored in the memory 212 executed by the processor 211. The communicator 213 can be, for example, a network interface card (NIC), a Wi-Fi™ module, a Bluetooth® module and/or any other suitable wired and/or wireless communication device. Furthermore, the communicator 213 can include a switch, a router, a hub and/or any other network device. The communicator 213 can be configured to connect the compute device 201 to a communication network (not shown in FIG. 2). In some instances, the communicator 213 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 213 can facilitate receiving and/or transmitting data or files through a communication network. In some instances, received data and/or a received file can be processed by the processor 211 and/or stored in the memory 212.

The processor 211 can be, for example, a hardware based integrated circuit (IC) or any other suitable processing device configured to run and/or execute a set of instructions or code. For example, the processor 211 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 211 can be operatively coupled to the memory 212 through a system bus (for example, address bus, data bus and/or control bus).

Figure 3:
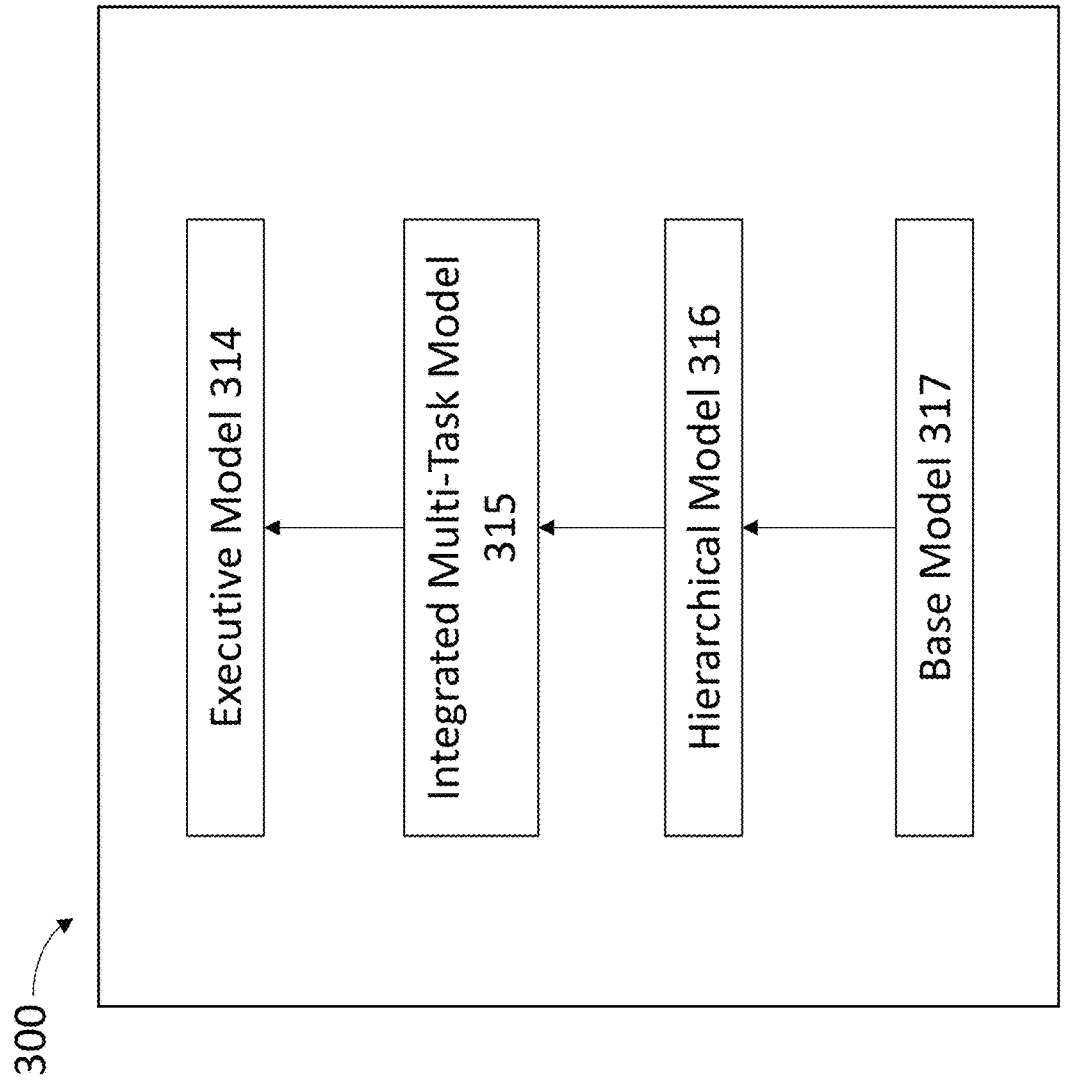
FIG. 3 is a schematic representation of an agent architecture used to implement an agent, according to an embodiment.
Figure 4:
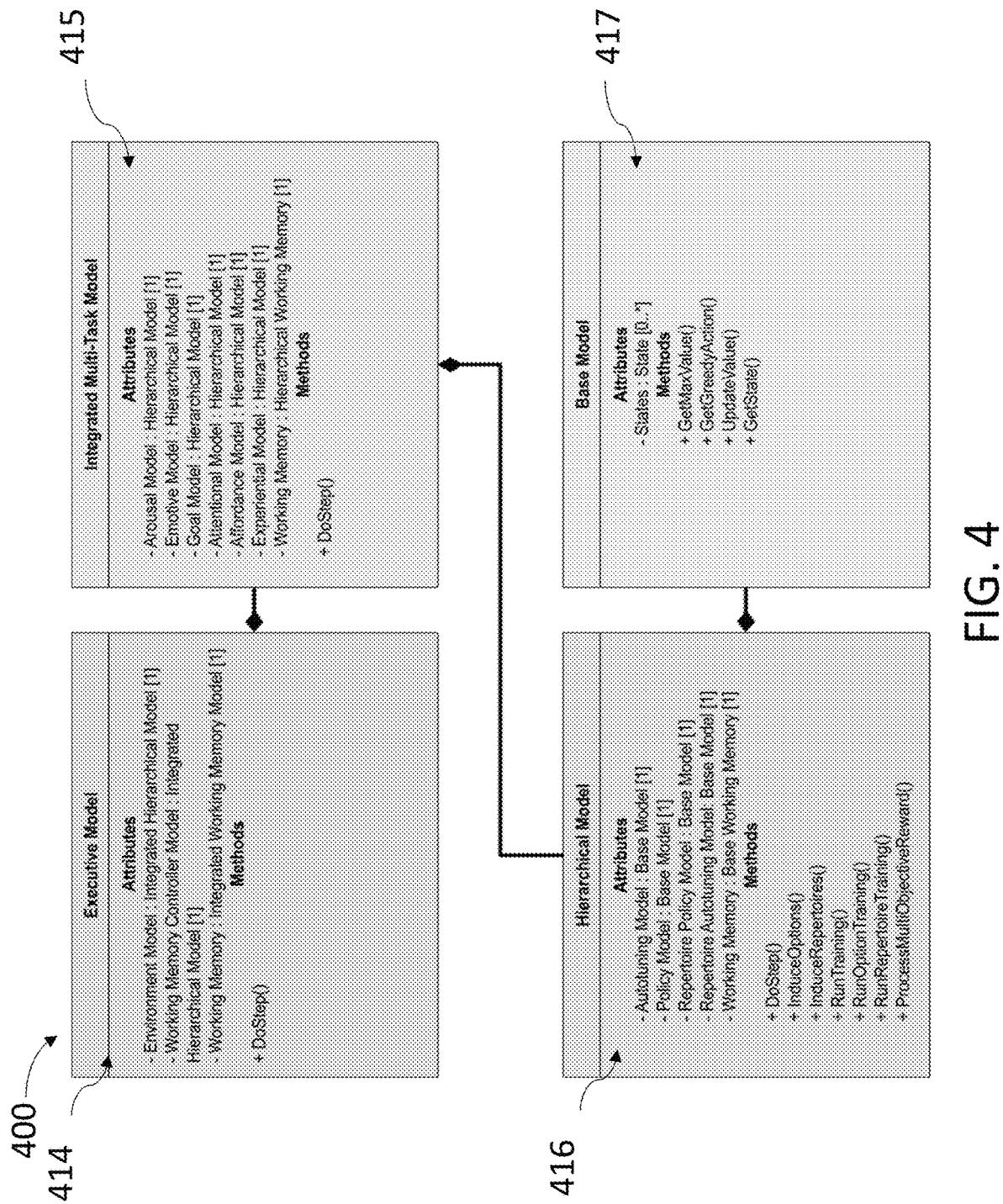
FIG. 4 illustrates a hierarchical design of an agent architecture that implements different aspects of an agent reasoning workflow, according to an embodiment.
Figure 5:
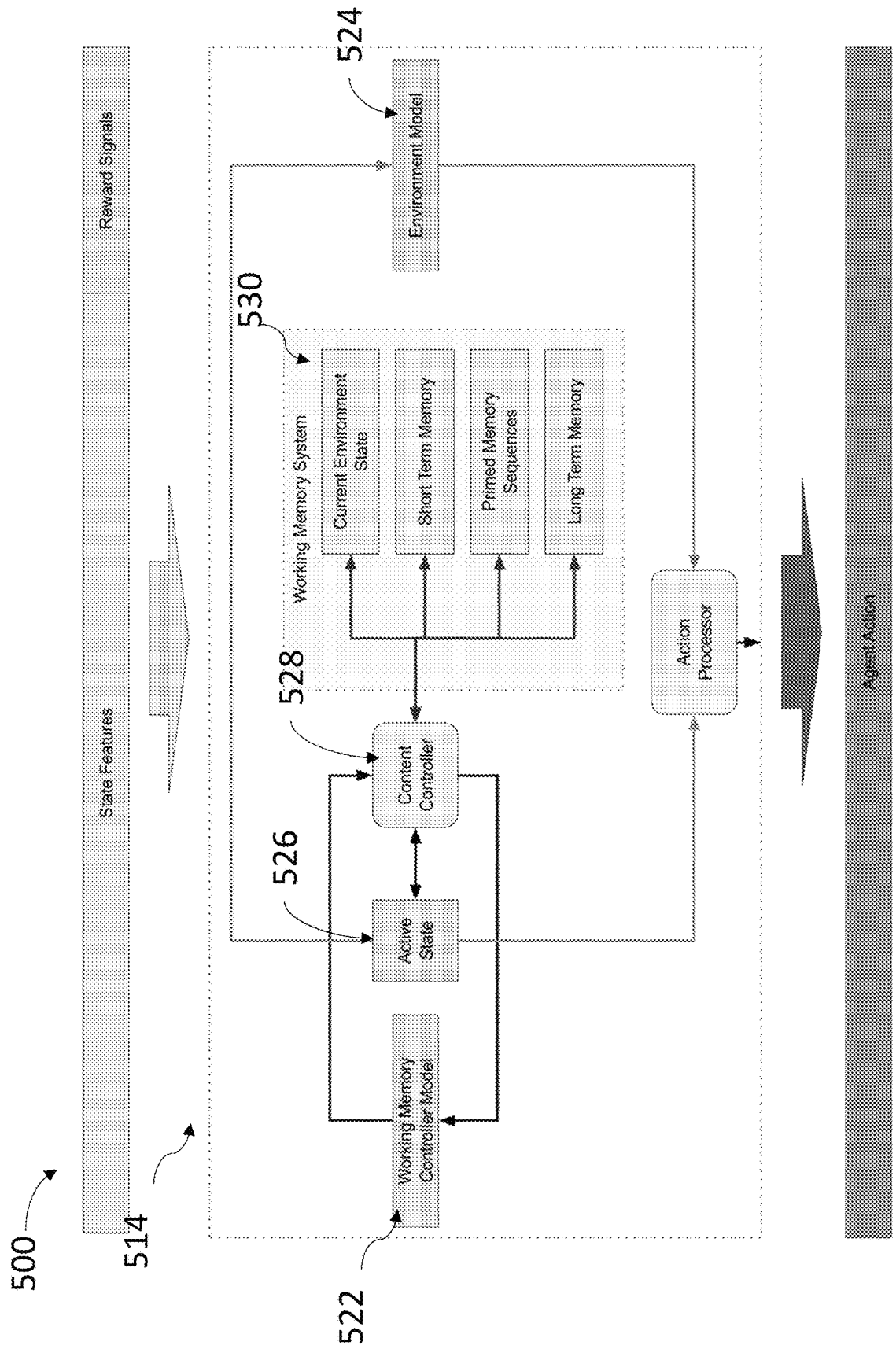
FIG. 5 illustrates an executive model in an example agent architecture, according to an embodiment.
Figure 6:
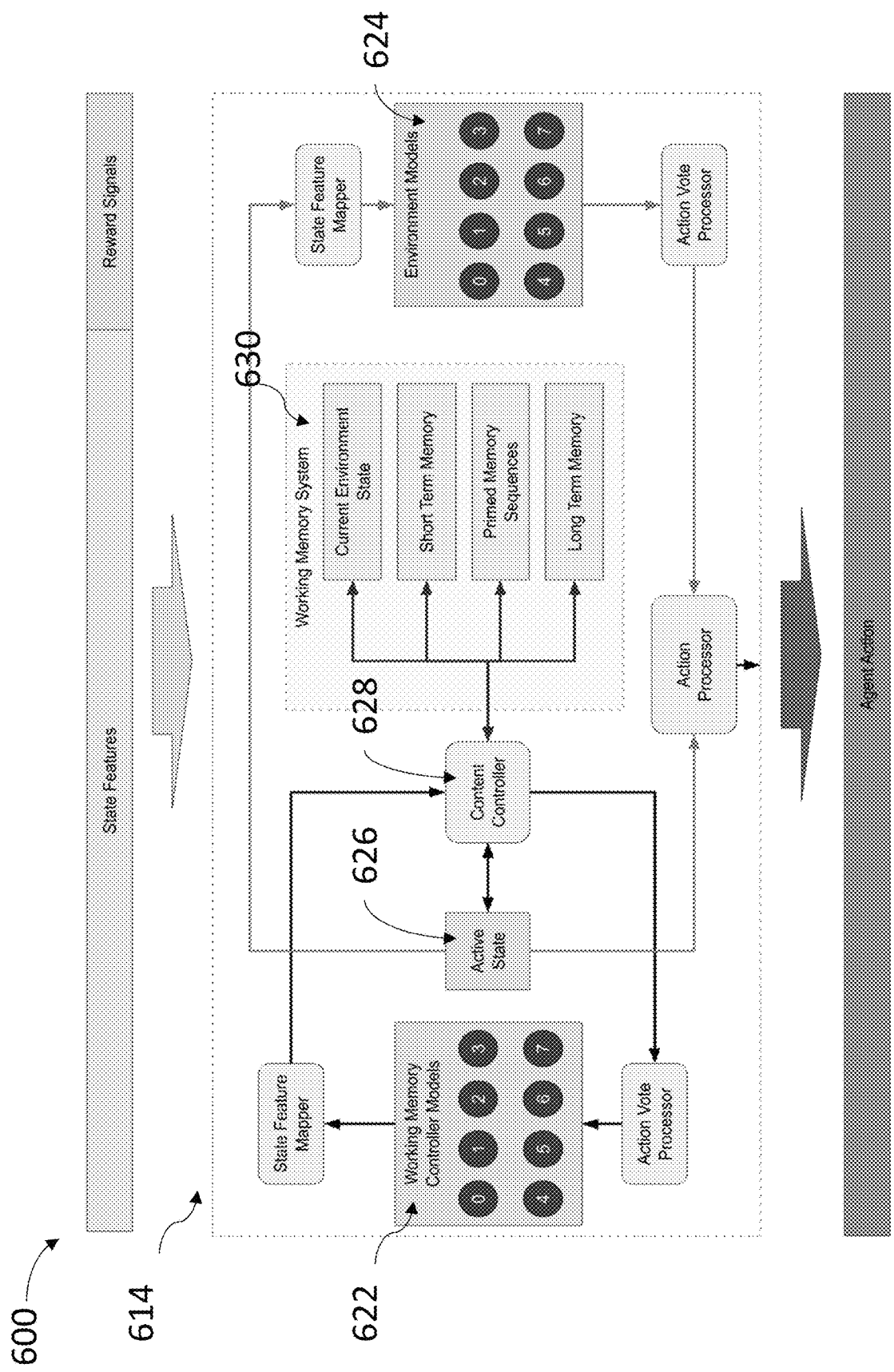
FIG. 6 illustrates an executive multi-agent model in an example agent architecture, according to an embodiment.

The processor 211 can implement an executive model 214 (e.g., similar to executive models shown and described herein, for example, with respect to FIGS. 3, 4, 7 and 8), an integrated multi-task model 215 (e.g., similar to integrated multi-task models shown and described herein, for example, with respect to FIGS. 3, 4 and 6), a hierarchical model 216 (e.g., similar to hierarchical models shown and described herein, for example, with respect to FIGS. 3, 4 and 5), and a base model 217 (e.g., similar to base models shown and described herein, for example, with respect to FIGS. 1, 3 and 4). In some embodiments, each of the executive model 214, the integrated multi-task model 215, the hierarchical model 216, and/or the base model 217 can be software stored in the memory 212 and executed by processor 211. For example, each of the above-mentioned portions of the processor 211 can be code to cause the processor 211 to execute the executive model 214, the integrated multi-task model 215, the hierarchical model 216, and/or the base model 217. The code can be stored in the memory 212 and/or a hardware-based device such as, for example, an ASIC, an FPGA, a CPLD, a PLA, a PLC and/or the like. In other embodiments, each of the executive model 214, the integrated multi-task model 215, the hierarchical model 216, and/or the base model 217 can be hardware configured to perform the specific respective functions.

Architecture Overview

In some embodiments, the agent architecture can be built on a hierarchical design that implements different aspects of the agent reasoning workflow, shown in FIG. 1. FIG. 3 shows a schematic representation of an architecture of a system 300 to implement a digital agent capable of general intelligence, as described herein, according to come embodiments. The system 300 can be substantially similar in structure and/or function not the systems 100, 200, 400, 500, 600, 700, and 800, described herein, with one or more models in the stack (e.g., Executive, Integrated Multi-Task, Hierarchical, Base) of the former being substantially similar to one or more models in the corresponding class level of the latter, respectively. The system 300 includes an architecture with a hierarchical class organization of the models stacked to form the set of models that determine agent behavior. The agent class hierarchy includes the Executive model 314 at the highest level, the Integrated Multi-Task model 315 at the next level, the Hierarchical model 316 at the subsequent level, and Base model 317 at the lowest level. The Executive Model 314 can be responsible for behavior priming, composition, skill learning and adaptive lookahead. The primary learning algorithm, the Integrated Multi-Task Model 315, uses the environment context and changes in reward over time to learn goals, attentional features, and action affordances to regulate behavior and build enhanced reference frames. The Hierarchical model 316 performs skill learning and supports adaptable behavior in non-stationary statistical environments, and the base model 317 operates by implementing Q-Learning as described herein.

FIG. 4 is a schematic representation of an architecture of a system 400 to implement a digital agent capable of general intelligence, as described herein, according to some embodiments. In some embodiments, the system 400 can be substantially similar in structure and/or function to the systems 100, 200, 300, 500, 600, 700, and/or 800, described herein, with one or more models in the stack (e.g., Executive, Integrated Multi-Task, Hierarchical, Base) of the former being substantially similar to one or more models in the corresponding class level of the latter, respectively. The system 300 includes a hierarchical class organization of the models stacked to form the set of models that determine agent behavior. The agent class hierarchy includes the Executive Model 414 at the highest level, the Integrated Multi-Task Model 415 at the next level, the Hierarchical Model 416 at the subsequent level, and Base Model 417 at the lowest level. The individual model or models at each level in the system 400 can be substantially similar in structure and/or function to each individual model or models at each level in the system 400

Executive Model

In some implementations, the Executive model 414 can include an environment model, a working memory controller model, and a working memory system. In some implementations, the Executive model 414 can be configured to regulate agent behavior and high-level learning through a multi-store memory system. The multi-store memory system can be configured to control the active state value which is selected by a Working Memory Controller model. In some implementations, the system can include an internal virtual representation of one or more portions of the world, also referred to as an internal model (different from the environment model and not shown in FIGS. 5,6). The agent can be configured to interact with the internal model to learn potential behaviors. The Environment model interacts with the active state value generating behavior for execution within the environment or the agent's internal model. This architecture supports the agent switching adaptively between the live environment and its internal model, similar to biological organisms.

FIG. 5 is a schematic representation of an example executive model 514 of a system 500, according to an embodiment. The system 500 can be substantially similar in structure and/or function to the systems 100, 200, 300, 400, 600, 700, and/or 800, described herein. The executive model 514 can be substantially similar to the executive models 214, 314, 414, and/or 614 described herein. The system 500 can be executed using a processor and a memory, similar to 214 shown in FIG. 2.

In some implementations, the Executive model 514 regulates agent behavior through a multi-memory management system and environment model for behavior generation, as shown in FIG. 5. Using current and prior agent experience, the Working Memory Controller (WMC) model 522 selects and composes candidate behaviors for future execution. The WMC works indirectly with the Environment model 524 through updates to the Active State value 526. The Content Controller (CC) 528 updates memory collection states and matches primed behavior for execution. Additionally, the WMC 521 modulates the CC 528 to build candidate behaviors and skills through an imagination like process. Working Memory System (WMS) 530 contains multiple state value stores that include:

1. Current Environment State (CES)
2. Short Term Memory (STM)
3. Primed Memory Sequences (PMS)
4. Long Term Memory (LTM)

Working together, the WMC 522 and the Environment model 524 execute and build adaptive behaviors through interaction with the environment and its internal representation of the environment. This approach to implementation leverages execution of options in the environment to allow the agent to process internal experience for adaptive lookahead (e.g., predictive lookahead by an agent before a decision on a choice point is made) and for behavior priming (priming one or more behaviors (responses of an agent to input) by using prior know behavior that includes a prior known sequence of actions and state changes, for example, when an agent encounters an external stimulus, the external stimulus activates an internal construct associated with the stimulus, which may in turn affect overt behavior of the agent by way of the subsequent actions performed). This allows the agent to computationally switch between internal and external stimuli using the same reasoning workflow. In some embodiments, the executive model 514 can receive input from an integrated multi-task model (e.g., the integrated multi-task models 215, 315, 415, 715) to support an agent behavior.

In some implementation, a system can implement an executive model that is configured to support multi-agent behavior. FIG. 6 shows an example executive model 614 in a system 600, according to some embodiments. The system 600 can be substantially similar in structure and/or function to the systems 100, 200, 300, 400, 500, 700, and/or 800, described herein, with one or more models in a stack. As shown in FIG. 6, in an alternative architecture, the Executive model 614 includes WMC and Environment models that can include multiple Integrated Multi-Task (IMT) models to support distributed state features and ensemble boosted decision making in multiple agents, implemented with small changes to support action voting logic and state feature routing to sub-models.

Integrated Multi-Task Model

Returning to FIG. 4, the system 400 includes the integrated multi-task model 415. The Integrated Multi-Task (IMT) model 415 shown in FIG. 4 can represent the primary learning algorithm for the agent. In some implementations, the IMT model 415 models the emotional states with arousal and emotive models that use the change in reward value or Q-value over time to select sub-goals, attentional features, and action affordances. Creating an enhanced context for the agent to reason upon, these reward values or Q-values also constrain agent behavior within a context. In test experimental studies, it was observed that these enhanced constraints significantly improved agent performance over standard Q-learning, as described below.

Emotions in the IMT model are used to guide the decision-making process by reducing the state-space on which the agent reasons and selects contextually aware strategies depending on the agent's recent history. The IMT model includes a set of models that enhance agent context and subtasks that can regulate behavior that is provided to an Experiential model, which generates agent behavior. These models can include, for example, Arousal Model, Emotive Model, Goal Model, Attentional Model, Affordance Model.

In some implementations, a goal of the IMT model and/or the agent architecture can be to balance an exploratory behavior (e.g., greedy or risk seeking behavior) of an agent, which might help find new unknown rewards at the cost of potentially encountering unknown risks, with an exploiting current rewards behavior, which might ensure lower risk associated with the agent's behavior at the cost of reduction in potential to find new rewards. In some implementations, a goal of the IMT model and/or the agent architecture can be to implement an agent that can manage lack of control of its own behavior while also navigating unknown non-stationary environments to achieve superior performance indicated by higher cumulative rewards and/or achieved goals.

As an illustrative example, a digital agent can be configured to walk along a trail in a hypothetical digital park which can serve as a digital environment. The agent can be configured to monitor changes in rewards in the environment. When encountering a hazard (e.g., a poisonous snake) the agent may register, from past experience, that the snake is associated with a negative reward rate. An emotive model and/or an arousal model in the IMT model 415 can recognize the threat posed by the hazard and induce a selection of a new sub-goal, for example, to take a path circumventing the hazard. In some implementations, the IMT model 415 can use an attentional mask, using the attentional model, as described herein to implement a restriction on what features in the state space the agent must pay attention to (e.g., features like the trail, the snake, etc.). In some implementations, the IMT model 415 can use an affordance mask, using an affordance model as described herein, to implement a restriction on what actions the digital agent can take to navigate the trail and avoid the hazard (e.g., walk away from the hazard and not be able to walk toward the hazard, etc.).

The models included in the IMT model can create and/or different agent contexts depending on recent agent interactions with the environment, allowing the agent to select between a set of behaviors that are more adaptive to the current context. In some implementations, for example, the arousal and emotive models compute the agent's rate of acquisition and change in rate of acquisition of reward otherwise referred to as speed and acceleration in receiving external rewards, which are incorporated into the agent's state representation. The goal, attentional, and affordance models use separate Q-learning processes to learn the sub-goal, attentional mask and affordance mask, respectively, which the Experiential model can use. In turn, the external rewards received by the Experiential model are used to update the other models. The parameters associated with each model can co-evolve and each mask can be reduced to a single integer value, and can be set using Q-learning. In some implementations, one or more of each of these models can receive input from the hierarchical model at the subsequent hierarchical level.

An agent's state in an environment can include a set of state features and their values. This set of state features and their values associated with the environment is referred to as the environmental state to differentiate from other state features computed by an agent, e.g., the emotive and arousal states.

Figure 7:
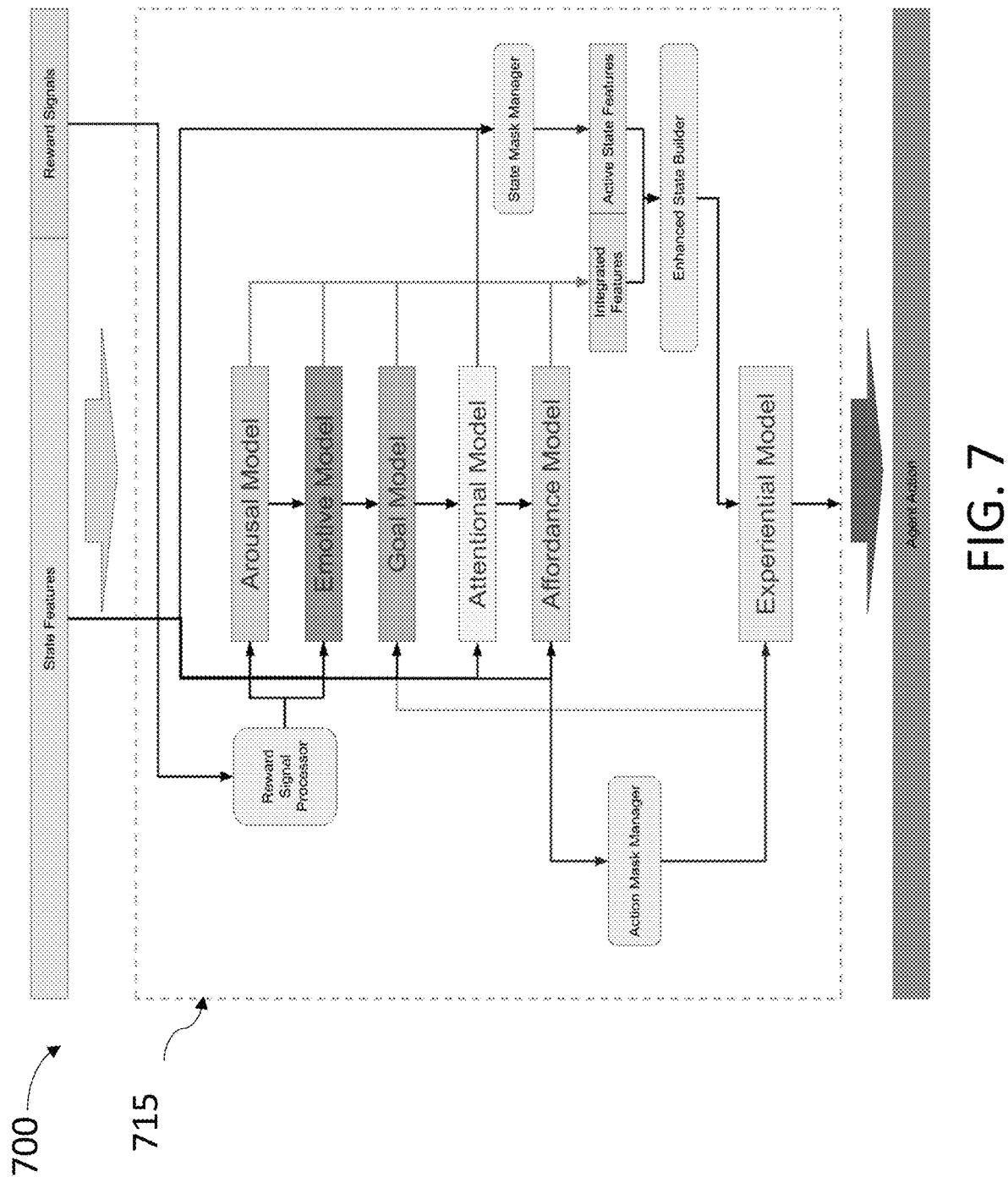
FIG. 7 illustrates an integrated multi-task model in an example agent architecture, according to an embodiment.

FIG. 7 is a schematic illustration of an example integrated multi-task (IMT) model 715 in a system 700, according to an embodiment. The system 700 can be substantially similar in structure and/or function to the systems 100, 200, 300, 400, 500, 600, and/or 800, described herein, with one or more models in the stack (e.g., Executive, Integrated Multi-Task, Hierarchical, Base). The IMT model 715 can be substantially similar in structure and/or function to the IMT models 215, 315, and 415, described herein. In some implementations, the IMT model 715 can provide outputs to an executive model as described herein (e.g., executive model 214, 314, 414, 514, 614). The IMT model 715 can be configured to implement the affective system. In some implementations, the IMT model 715 can be configured to include the emotional system implemented by one or more models, as described below.

In some implementations, the emotional system includes an arousal model and an emotive model, which keep track of the change of external reward value over time, and that predict the change of Q-value over time. Using a sliding window of 20 steps, the emotive model averages the first derivatives of the Q values in this window, and the arousal model averages the second derivative of the Q values. The arousal model predicts the second derivative of the Q value over time and the state value includes the current agent context and a predefined arousal target percent change. The emotive model predicts the first derivative of the Q value over time and the state value includes the current agent context, second derivative Q value and Emotive target percent change (see below).

$$\text{emotive} \leftarrow \sum_t \frac{dQ}{dt}$$

$$\text{arousal} \leftarrow \sum_t \frac{d^2Q}{dt^2}$$

The arousal/emotive reward functions are computed by the percent error value from the expected value of the first derivative and the second derivative of the Q value over time. The arousal has a statically set target percent difference value controlling the degree of reward seeking behavior in which the agent can engage. The arousal model selects the target of the emotive model percent change value depending on the current context and arousal state.

$$S_{Arousal} = S_{env}|f''(x)|f''(\exp)|T_{Arousal} \quad \text{(Eq. 1—Arousal State)}$$

$$S_{Emotive} = S_{env}|f'(x)|f'(\exp)|f''(x)T_{Emotive} \quad \text{(Eq. 2—Emotive State)}$$

The arousal state is constructed by concatenating environment state features, second derivative value, expected second derivative value and the target arousal percent difference value. The variables and/or features in Arousal State (Equation 1) can be:

$S_{env}$=Environment State Features
f''(x)=Second Derivative Q-Value in Recent History
f''(exp)=Expected Second Derivative Q-Value
$T_{Arousal}$=Target Percent Difference from Expected Value The emotive state is constructed by concatenating environment state features, first derivative value, expected first derivative value, second derivative value and the target emotive percent difference value. The variables and/or features in Emotive State (Equation 2) can be:

$S_{env}$=Environment State Features
f'(x)=First Derivative Q-Value in Recent History
f'(exp)=Expected First Derivative Q-Value
f''(x)=Second Derivative Q-Value in Recent History
$T_{Emotive}$=Target Percent Difference from Expected Emotive Value The reward signals for the affective system is computed by evaluating the percent difference of the first and second derivative change in Q value of the agent over time. The Arousal Reward Signal and the Emotive Reward Signal can, for example, be computed as shown in Equation 3 and Equation 4, respectively.

$$R_{Arousal} = \frac{1}{1 - \left| \frac{f''(env) - f''(pred)}{f''(pred)} * 100 - T_{Arousal} \right|} \quad \text{Eq. 3-Arousal Reward Signal}$$

$$R_{Emotive} = \frac{1}{1 - \left| \frac{f'(env) - f'(pred)}{f'(pred)} * 100 - T_{Emotive} \right|} \quad \text{Eq. 4-Emotive}$$

-continued

Reward Signal

In some implementations, the IMT model 715 includes a goal model that is responsible for selection of sub-goal states for the agent to achieve within an environment context. The affective system provides enhanced state context and the goal model selects the next sub-goal for the experiential model. Thus, the Goal model provides the agent an intrinsic reward by pointing out the goal state to which the agent should move. As the agent interacts with the environment, the sub-goal sequences are learned for the different agent tasks. The emotive and arousal values are used in selecting the subgoal target value by the goal model. The output values from the Affective system are numeric values ranging from 0 to 1.0. Since this work uses tabular-based Q learning, these values are discretized using an interval of 0.01 into the agent's state features.

The goal model uses a Q learning agent to learn the subgoal. The agent's state is environmental state concatenated with emotive and arousal states. In some implementations, initially, the subgoal state can be randomly selected from the environmental state, denoted as an index number of the state. There are two actions the goal model Q learning agent can take: either increase the index of the subgoal state or decrease the index of the subgoal state. This agent uses the external reward received from the experiential model as its reward. Observations of the new environmental state are passed from the experiential model as well. Simultaneously, the affective model updates the emotive and arousal states. Over time, the agent learns to select contextually relevant subgoals for the agent to achieve to maximize and/or improve reward.

$$S_{Goal}=S_{env}|f'(x)|f''(x) \quad \text{Eq. 5—Goal State Definition}$$

The variables and/or features in Goal State Definition (Equation 5) can be:
$S_{env}$=Environment State Features
f'(x)=First Derivative Q-Value in Recent History
f"(x)=Second Derivative Q-Value in Recent History In some implementations, the IMT model 715 can include an attentional model that is responsible for selecting the enabled environment state features that are used to build and/or calculate the experiential state value. Inspired by the attention process in humans and animals, not all of the agent's possible states are considered equally relevant to its current task. The attentional model is responsible for selecting the active state features to which the agent should be attending, i.e., pay attention to when interacting with the environment. The attentional model selects state features by creating and modifying an attentional mask which can be a bit map vector. The mask has the same size as environmental state. The attentional mask is represented by the decimal value of the bit map. For example, assuming the agent's environmental state has 5 state features, the value for the Attentional mask below is 42 (e.g., subgoal_mask= [101010]).

Over time as the agent interacts with the environment, the attentional model learns to select feature masks that are contextually relevant to its task. The attentional model can use a Q learning agent that functions similarly to the goal model. The Q learning agent's state is the environmental state. Initially, the attentional mask can be randomly set, and represented as its decimal integer value. The Q learning agent has two actions: either increase or decrease the value of the mask. The external reward received from the Experiential model can be used as the Q learning agent's rewards. The experiential model also updates the environmental state.

The Attentional model incorporates the current Affective context with the current goal and learns what state feature masks should be applied to the input environment states features.

$$S_{Attention}=S_{env}|f'(x)|f''(x)|S_{Goal} \quad \text{Equation 6—Attention State Definition}$$

The variables and/or features in Attention State Definition (Equation 6) can be:
$S_{env}$=Environment State Features
f'(c)=First Derivative Q-Value in Recent History
f"(x)=Second Derivative Q-Value in Recent History
$S_{Goal}$=Current Subgoal In some implementations, the IMT model 715 includes an affordance model that is responsible for selecting what action types are enabled within a given context. As the agent interacts within an environment, the Affordance model provides an action inhibition function similar to biological organisms.

The affordance model uses a similar masking approach as the attentional model, where the state features include environmental state, emotive, and arousal states. The affordance mask is a bit map that specifies which action is applicable in each state. Similarly, as in other models, the mask can be randomly initialized. Then using the external reward observed from the Experiential Model. as reward, a Q learning agent either increases or decreases the mask's value, and eventually learns to reduce the possible errant actions.

$$S_{Affordance}=S_{env}|f'(x)|f''(x)|S_{Goal} \quad \text{Equation 7—Affordance State Definition}$$

The variables and/or features in Attention State Definition (Equation 7) can be:
$S_{env}$=Environment State Features
f'(x)=First Derivative Q-Value in Recent History
f"(x)=Second Derivative Q-Value in Recent History
$S_{Goal}$=Current Subgoal
$S_{Attention}$=Current Attention Feature Mask In some implementations, the Experiential model is responsible for executing agent behavior in the environment. This model maintains the agent's model of the environment supporting the agent's adaptive lookahead and behavior priming functionality.

$$S_{Experiential}=S_{env}|f'(x)|f''(x)|\ldots \quad \text{Equation 8—Experiential State Definition}$$

The variables and/or features in Experiential State Definition (Equation 8) can be:
$S'_{env}$=Environment State Features after Attention Mask
f'(x)=First Derivative Q-Value in Recent History
f"(a)=Second Derivative Q-Value in Recent History
$S_{Goal}$=Current Subgoal
$S_{Attention}$ Current Attention Feature Mask
$S_{Affordance}$=Current Affordance Feature Mask The IMT 715 includes the experiential model that is responsible for executing agent behavior in the environment. The experiential model can enhance the current environment state value with the other multi-task models state values. The experiential model is also responsible for passing the environmental state and rewards received from the environment to other models for training purposes at each time step. In return, the experiential model receives emotive, and arousal values, subgoal state, attentional mask, and affordance mask from the affective, goal, attentional, and affordance models. The emotive and arousal values become part of the experiential model's state. The Attentional mask is applied to reduce its full state space to the active state space. Then the digital agent, a Q learning agent, can be used to interact with the environment. The set of actions of the Q learning agent in the Experiential model can perform is the set of actions supported by the environment. For example, in the game Go, the action set includes placing a piece at all possible positions on the board. The subgoal and affordance mask are used for tie-breaking in the agent's action selection process. More specifically, if multiple actions are of equal utility to the agent, the agent will take the action that can likely move its state to the subgoal state, and avoid actions that are masked in the affordance mask. Algorithm 1 describes an example workflow of the Experiential Model.

Algorithm 1 Experiential Model( )
    states←environmental state+emotive+arousal
    actions←actions supported by the environment
while True do
    states←states*attentional mask
    action←Q Learning with subgoal and affordance mask for tie breaking
    environmental state, reward←execute action in the environment
    states←environmental state+emotive+arousal
    emotive, arousal←affective model(reward)
    subgoal←Goal Model(states, reward)
    attentional mask←attentional model(environmental state, reward)
    affordance mask←affordance Model(states, reward)
end while Thus, the models in the IMT model help provide an enhanced awareness of the context to the digital agent in addition to the state features and reward signals that are received by the agent. Additionally, the system sets the experiential model active subgoal and the modified environment state value. Before the agent action is executed, the action type is verified against the current affordance action mask. The affordance mask, the attentional mask and the sub-goal determined by the goal model can act as invisible side effects on the inputs to the experiential model to select agent action.

Hierarchical Model

Returning to FIG. 4, the system 400 includes the hierarchical model 416. The hierarchical model 416 shown in FIG. 4 can be configured to build and maintain the hierarchical representation of the agent experience. The hierarchical model 416 can learn and execute options and sequences of options and as a component of the multi-task model shown in FIG. 4. In some implementations, as shown in FIG. 4, the hierarchical model 416 can include an auto-tuning model, a policy model, a repertoire policy model, a repertoire auto-tuning model, and a working memory model.

In some implementations, the hierarchical model builds and maintains a hierarchical representation of the agent experience. The hierarchical model can learn and execute options and sequences of options and can be a part of the multi-task model of FIG. 4. The Auto-Tuning model selects the RL hyperparameter configurations for the sub-models that control learning and agent behavior to support and non-stationary environments.

Figure 8:
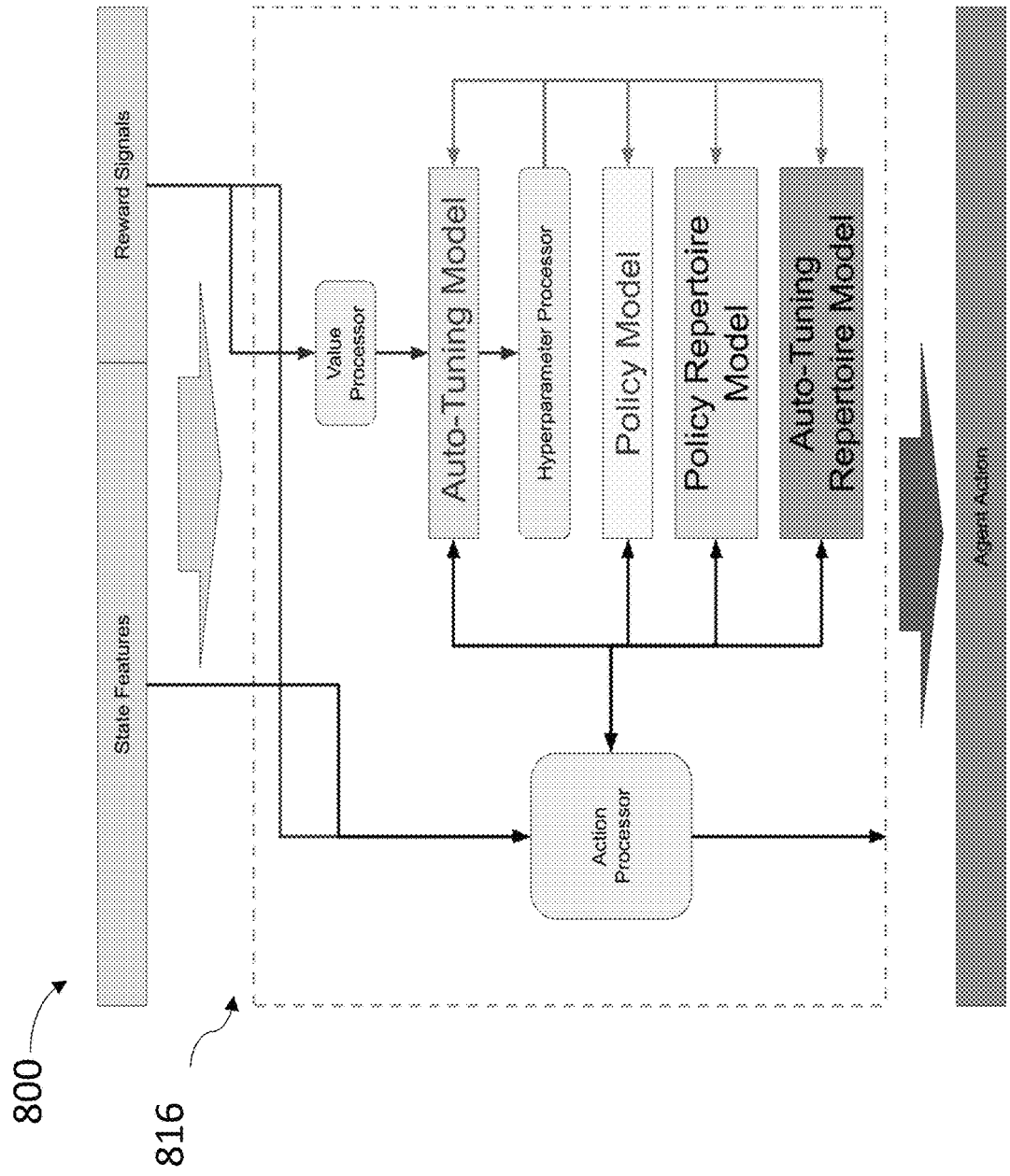
FIG. 8 illustrates a hierarchical model in an example agent architecture, according to an embodiment.

FIG. 8 is a schematic illustration of an example hierarchical model 816 in a system 800, according to an embodiment. The system 800 can be substantially similar in structure and/or function to the systems 100, 200, 300, 400, 500, 600, and/or 700, described herein, with one or more models in the stack (e.g., Executive, Integrated Multi-Task, Hierarchical, Base). The hierarchical model 816 can be substantially similar in structure and/or function to the hierarchical models 216, 316, and 416, described herein. In some implementations, the hierarchical model 816 can provide outputs to an IMT model as described herein (e.g., IMT model 214, 314, 414, 514, 614). The hierarchical model 816 can include a value processor that receives the external reward value over time (e.g., rewards received over time). The value processor can process the information received and send the information to a set of models including an auto-tuning model, a hyperparameter model, a policy model, a policy repertoire model, and an auto-tuning repertoire model. For example, the value processor can receive input from the environment, and extract reward signals or values from the environment, and send the reward signal or value to the auto-tuning model and the hyperparameter processor, for example. Each model from the set of models can be a Q-learning model. The hierarchical model 816 can further include an action processor that receives input associated with state features from the environment and processes what action to take. The action processor can receive inputs from and/or send inputs to the auto-tuning model, the policy model, the policy repertoire model, and the auto-tuning repertoire model, as shown in FIG. 8. The action processor can then provide an output indicative of agent action.

The Auto-Tuning model selects the RL hyperparameter configurations for the sub-models that control learning and agent behavior in non-stationary environments. The policy model can generate and/or modify an existing policy based on received updates from the environment including reward signals or values. The policy repertoire model can access and adjust or modify policies from a repertoire of policies based on information from the environment and/or the agent's action.

Each model including the auto-tuning model, the policy model, the policy repertoire model, and the auto-tuning repertoire model in the hierarchical model shown in FIG. 8 can be a base model. A base model is a state-based Q-Learning model that supports Q-value updates and the Q-table of values of the agent. Such a Q-Learning model can be used as a base model for testing purposes. Other suitable testing models can be used in addition to or instead of the base model.

In some implementations, one or more models can be initiated with a slight bias in one or more hyperparameters to induce specific behavior in an agent. For example, in some implementations, an emotive model and/or an arousal model can be initialized with a slight bias (e.g., positive bias) to one or more hyperparameters associated with that model (e.g., positive bias to an emotive or arousal hyperparameter) to help guide agent behavior and/or learning in a specific direction (e.g., be less affected by negative reward rate, etc.). One or more set points can be used to control the agent behavior (e.g., configure the agent such that the agent does not easily get negatively affected by negative rewards or to avoid negative loops).

In some implementations, one or more models can be configured or initialized to have a ceiling, or a floor associated with a parameter or hyperparameter to help guide agent behavior and/or learning in a specific direction. For example, controlling or limiting a rate at which an agent can achieve rewards can help control a reward seeking behavior of an agent as some manipulations can be based on the rate of rewards. In some implementations, such manipulations can also help guide agent behavior in real world environments. For example, agents navigating financial environments of investments can be configured to act just sufficiently greedy to result in decrease in draw down and net reduction in portfolio value while still having the agent outperform in overall gains (cumulative investment gains).

One goal of such an agent can be set to achieve maximum reward while controlling volatility in maximizing gains.

In some embodiments, the systems and methods described herein describe an agent architecture or a model architecture, to implement a digital agent capable of general intelligence, that incorporates many functional and conceptual features that are shared by biological cognitive systems. The model architecture supports: an executive model, an integrated Multi-Task (IMT) Model, a hierarchical model, and a base model, arranged in decreasing levels of a hierarchy. Which described as a single executive model, in some implementations, any suitable number of executive models can be implemented according to the agent architecture described herein. Similarly, any suitable number of IMT models, hierarchical models, and/or base models can be implemented as part of the described agent architecture. As described previously, the high-level functionality of each model at each level of the hierarchy is as follows:

Executive Model Primary Functionality
1. Adaptive behavior
2. Behavior priming
3. Context aware lookahead
4. Synthetic experience generation Integrated Multi-Task Model Primary Functionality
1. Adaptive strategy selection
2. Goal/Subgoal learning
3. Self-attention learning
4. Impulse control through action affordances Hierarchical Model Primary Functionality
1. RL hyperparameter auto-tuning
2. Learning of Options
3. Learning of sequences of Options Experimental Test Studies In one implementation, an agent (Test agent) generated using the agent architecture described herein can be used with Go game simulator with a 5×5 board. This game contains 28 state features corresponding to the 25 board positions, plus three possible statuses that each board position can assume-namely empty, black, and white.

The agent can be implemented using an embodiment of the agent architecture described herein. A known Q-Learning agent (Reference agent) was also implemented with basic update logic and static hyperparameters. The hyperparameter values for the Test agent and the Reference agent were similar: Alpha (learning rate)=0.1 Gamma (discount rate)=0.9 Epsilon=0.1.

The Test agent and the Reference agent played 10 episodes each with 500 games played per episode. The results of these episodes were averaged and used to obtain the graphical representations shown in FIGS. 9 and 10

Figure 9:
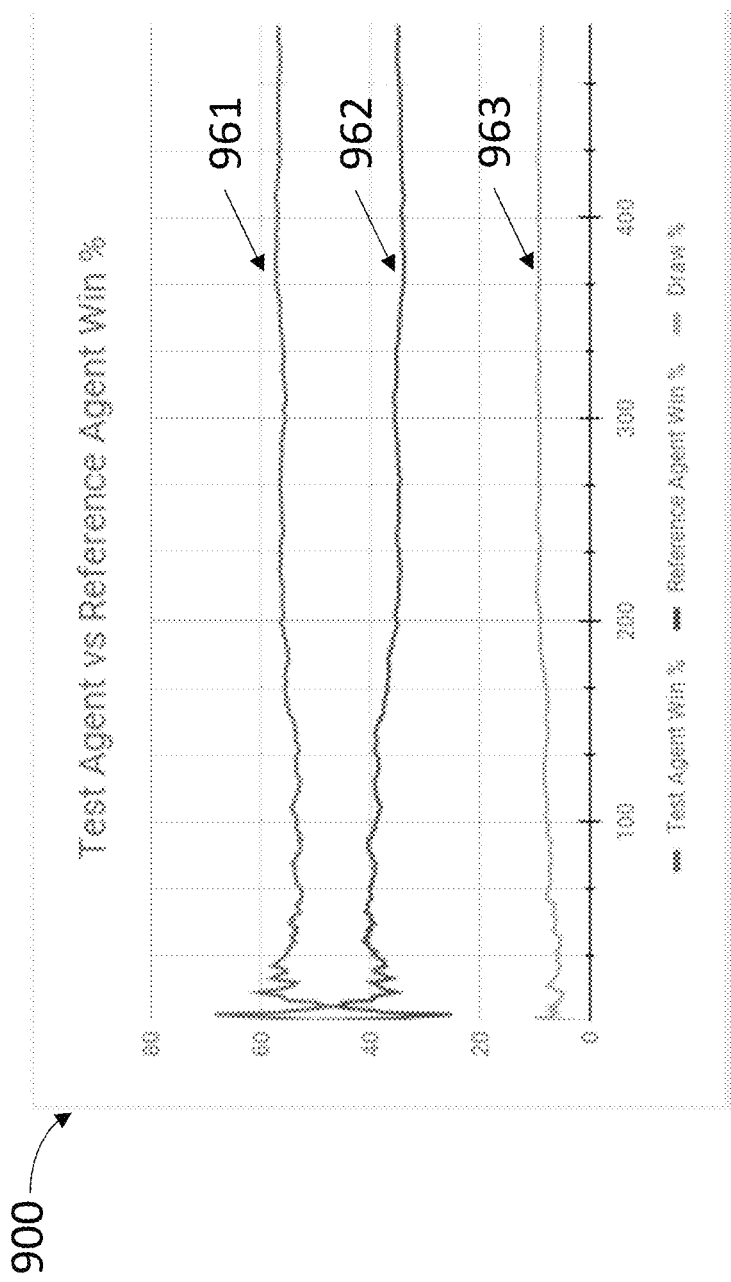
FIG. 9 is a graphical representation of results from an implementation of an agent architecture in an example test study, according to an embodiment.
Figure 10:
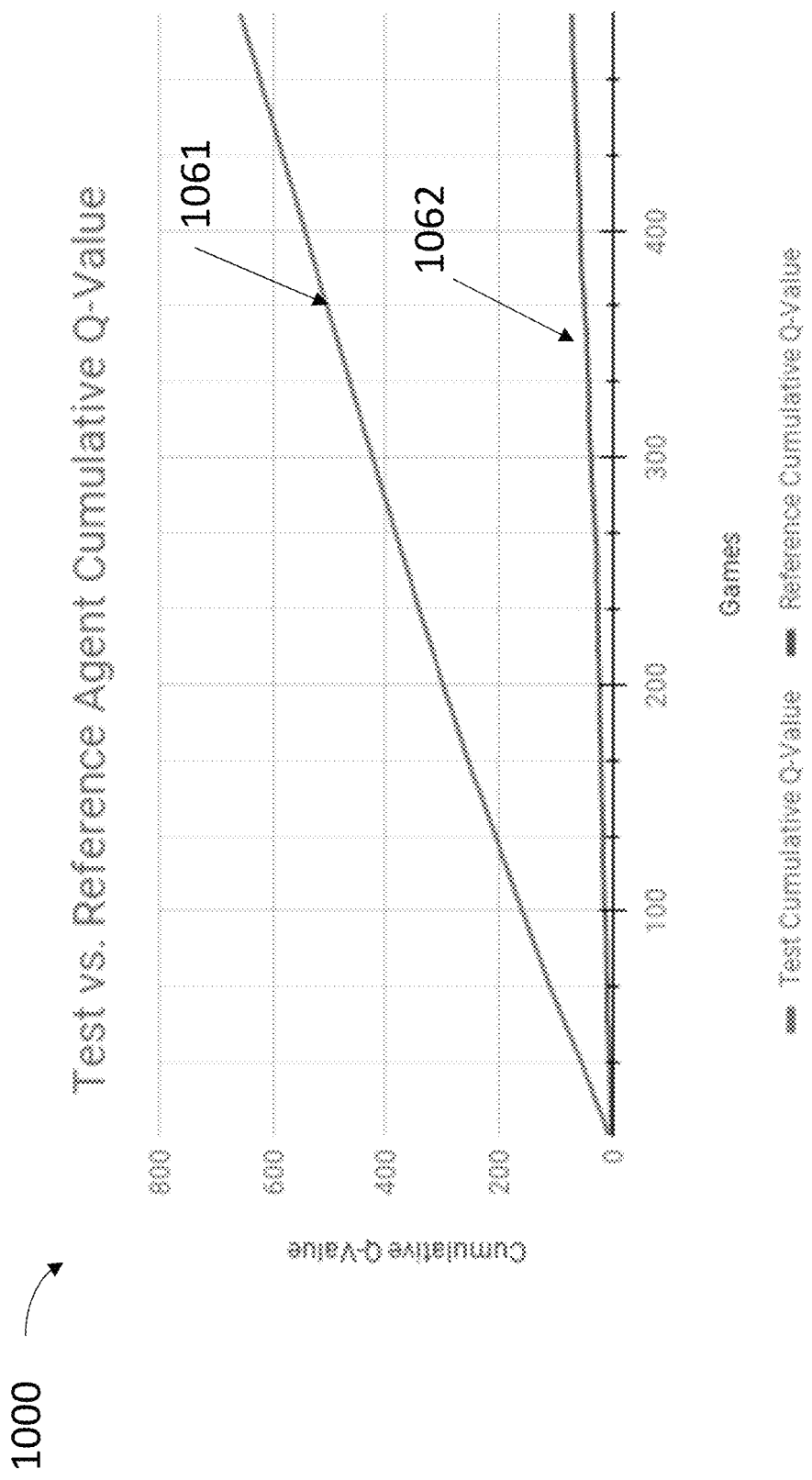
FIG. 10 is a graphical representation of results from an implementation of an agent architecture in an example test study, according to an embodiment.

FIG. 9 shows that the Test agent had an improved performance over the Reference agent with an average win rate of 56.56% of the Test agent shown by the steady state portion of curve 961 compared to the average win rate of 34.72% of the Reference agent, shown by the steady state portion of curve 962, with an 8.71% draw rate shown by the curve 963. FIG. 10 shows the average cumulative Q-value of the Test agent shown by curve 1061 and the average cumulative Q-value of the Reference agent shown by curve 1062 over the games played. As shown, the Test agent, implemented using an embodiment of the agent architecture disclosed herein, had an average cumulative Q-value that was 838% over the average cumulative Q-value of the Reference agent. These results from test experimental studies showed the superior performance of the Test agent implemented using the systems and/or methods disclosed herein, over the Reference agent using standard or conventional methods of implementing digital agents.

Figure 11:
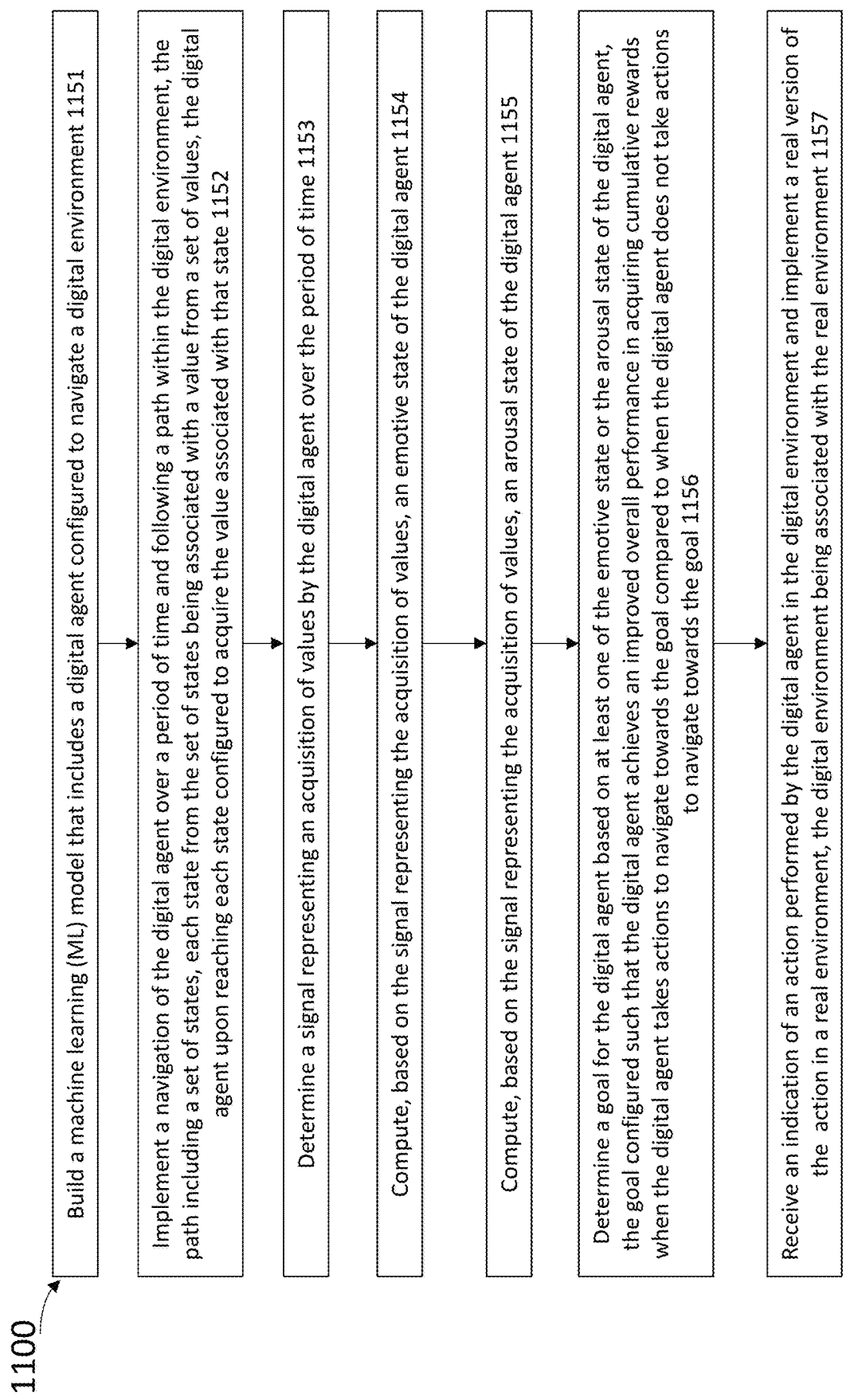
FIG. 11 is a flowchart showing an example method of implementing a digital agent using the systems and/or methods described herein, according to an embodiment.

FIG. 11 is an example method 1100 of implementing a digital agent as described herein, according to an embodiment. The method 1100 can be carried out using any of the systems and/or apparatuses having compute devices described herein. For example, the method 1100 can be executed by the system 100, 200, 300, 400, 500, 600, 700, and/or 800. The method can be executed via a processor of a compute device (e.g., processor 211 of compute device 201 of system 200 described with respect to FIG. 2), using one or more ML models (e.g., Executive model, Integrated Multi-Task model 215, Hierarchical model 216, and Base model 217).

In some implementations, a processor in a compute device of a system (e.g., the processor 211 of compute device 201 in system 200) can be used to extract instructions stored in a memory couple to the processor, extract suitable information stored in the memory (or obtained from any suitable external source) and execute one or more steps of method 1100. The method 1100 includes, at 1151, building a machine learning (ML) model that includes a digital agent configured to navigate a digital environment. The processor can generate the digital agent and/or the digital environment according to various suitable parameters.

At 1152, the method 1100 includes implementing a navigation of the digital agent over a period of time and following a path within the digital environment. The path includes a set of states and each state from the set of states is associated with a value from a set of values. The digital agent, upon reaching each state, is configured to acquire the value associated with that state. In some implementations, the navigation of the digital agent and the determining of the action to be performed by the digital agent can be executed by an Executive model (e.g., 214, 314, 414, 514, 614), as described herein.

In some implementations, the digital agent (also referred to as agent) can be implemented using reinforcement learning methods and/or Q-learning methods. In some implementations, the digital environment can be a simulation or a digital representation of a real-world environment. In some implementations, the digital agent can be a participant in the digital environment with predefined abilities and can perform an action selected from a set of actions and can move to a state selected from a set of states and associated with the action performed by the agent, within the digital environment. The agent can collect rewards also referred to herein as values (e.g., Q-value in a Q-learning framework), at each state transition following each action. The value can be positive or negative based on the features of the environment such as the state attained and the action used to attain the state.

The agent may be configured such that the agent is initially at a first state $(s_t)$ where the agent can initially receive a first reward $(r_t)$ at a first time (t). The agent, at the first state $(s_t)$ can perform a first action $(a_t)$. The first action $(a_t)$ at first state $(s_t)$ can be configured to result in the agent moving and/or transitioning to a second state $(s_{t+1})$ in the environment. At that second state $(s_{t+1})$ and at a second time, which can be the next incremental time point (t+1), the agent may receive a reward $(r_{t+1})$. In some implementations, the representation of a real-world environment can be via an environment model included in an Executive model described herein (e.g., environment model 524 of Executive model 514, environment model 624 of Executive model 614). Similarly, the agent may continue on a sequence of actions over a period of time forming a path (based on actions available from an identified state that the agent is at during a given time point) that lead to state changes and rewards associated with the state changes during the period of time. The state changes may be configured such that the agent incrementally progresses towards a goal state or the agent incrementally collects cumulative rewards that strive to meet a goal.

At 1153, the method includes determining a signal representing an acquisition of values (or rewards) by the digital agent over the period of time. In some implementations, the determining the signal representing the acquisition of values can be executed by a reward signal processor of an IMT model described herein (e.g., model 215, 315, 415, 715) as shown in IMT model 715 in FIG. 7. Any suitable time window can be used for the period of time. In some implementations, the period of time can be determined based on the real-world environment that is simulated by the digital environment and the nature of changes in the real-world environment (e.g., implementations that simulate a financial investment environment at a period of high fluctuations may use a smaller period of time compared to implementations that simulate a agricultural livestock management environment where variables tracked are slow changing variable like birth of progeny or changes in health conditions, etc.).

At 1154, the method includes computing, based on the signal representing the acquisition of values, an emotive state of the digital agent. In some implementations, the emotive state can be computed using an emotive model included in an IMT model (e.g., model 215, 315, 415, 715), as described herein. In some implementations, the emotive state can be computed using a first derivative of the signal representing an acquisition of values (first derivative value). The first derivative can be computed using any suitable mathematical method, for example by differentiating a signal representing the rate of acquisition of values by the agent. In some implementations, the first derivative of a signal representing an acquisition of values can indicate a rate of acquisition of values (rewards) that can capture an increase or decrease in acquisition of values.

In some implementations, the emotive model can be configured to predict a first derivative value associated with the signal representing the acquisition of values. In some implementations, the emotive model can be configured to compute the emotive state by concatenating environment state features, first derivative value, expected first derivative value, second derivative value and a target (e.g., predefined) emotive percent difference value.

At 1155, the method includes computing, based on the signal representing the acquisition of values, an arousal state of the digital agent. In some implementations, the arousal state can be computed using an arousal model included in an IMT model (e.g., model 215, 315, 415, 715), as described herein. In some implementations, the arousal state can be computed using a second derivative of the signal representing an acquisition of values (second derivative value). The second derivative can be computed using any suitable mathematical method, for example, by differentiating a first derivative of a signal representing the rate of acquisition of values by the agent. In some implementations, the second derivative of the signal representing an acquisition of values can indicate a rate of change of a rate of acquisition of values (rewards) that can capture an increase or decrease in the rate of acquisition of values (i.e., an acceleration in value or reward acquisition).

In some implementations, the arousal model can be configured to predict a second derivative value associated with the signal representing the acquisition of values. In some implementations, the arousal model can be configured to compute the arousal state by concatenating state features, second derivative value, expected second derivative value and the target (e.g., predefined) arousal percent difference value.

At 1156, the method 1100 includes determining a goal for the digital agent based on at least one of the emotive state or the arousal state of the digital agent. In some implementations, the goal can be determined using a goal model included in an IMT model (e.g., model 215, 315, 415, 715), as described herein, as shown in the IMT model 715 in FIG. 7. The goal can be configured such that the digital agent achieves an improved overall performance in acquiring cumulative rewards when the digital agent takes actions to navigate towards the goal compared to when the digital agent does not take actions to navigate towards the goal. An agent can have multiple agent tasks and different sub-goals can be learned for different agent tasks using the goal model via a learning method, for example, reinforcement learning.

In some implementations, the goal model can be configured to generate an intrinsic reward signal (e.g., an emotive reward signal or an arousal reward signal) that can be provided to the emotive model or the arousal model, as described herein, to guide the emotive model and/or the arousal model learn through reinforcement learning.

At 1157, the method 1100 includes receiving an indication of an action performed by the digital agent in the digital environment and implementing a real version of the action in a real environment. The digital environment can be associated with and/or represent the real environment. For example, the indication of an action performed by the digital agent can be purchasing a set of shares in a trading environment. The real-world version of the action can be a real transaction with the purchase of the indicated shares in a real-world trading market. As another example, the indication of an action performed by the digital agent can be administering a medicinal or health supplement to a cohort of livestock managed by the system in an agricultural livestock management environment. The real-world version of the action can be a real administration of the indicated medicinal or health supplement to the indicated cohort in real-world livestock managed by the system.

In use, in an example implementation, the systems and methods described herein can be implemented to manage and optimize exchanges in a trading environment. The system can generate an agent (or multiple agents, as described with reference to the system 600 in FIG. 6) in a simulated environment representing a real word trading environment, via, for example, an Executive model as described herein (e.g., executive model 524, 624). The variable in the trading environment can be represented in the environment model. The agent can perform actions including trading shares and the environment model can predict and reflect rewards or values that may be expected in the real-world environment. The executive model can also receive input from the real-world trading environment in the form of state features (e.g., state features associated with a state of a trading portfolio) and reward signals (e.g., results of transaction in the trading environment). The input can be provided to the environment model to reflect the received input from the real-world environment. The environment model can be configured to provide an output based on which the executive model can determine an action to be performed by the agent.

The environment model can include an integrated multi-task (IMT) model as described herein. The IMT model can include models such as an emotive model, an arousal model, a goal model, an affordance model, and an attentional model. Each of the models included in the IMT model can be learning models and can be operated through learning approaches (e.g., reinforcement learning or Q-learning) using parameters and hyperparameters. The models included in the IMT model, such as the emotive model, the arousal model, and the goal model, can be used to determine a sub-goal of a target profit to be achieved by an identified time period, or a target number of shares of an identified entity to be obtained by an identified time period, etc. The overall goal can be a target level of cumulative profit from trading over a period of time. Additionally, the IMT model can include an attentional model that can help focus the attention of the agent on a sub-set of state features (e.g., to pay attention to recent trends in transactions based on a recent event, for example, a pandemic, a global market event, and to dismiss identified state features like variations in trends within smaller geographic areas, etc.). The IMT model can include an affordance model that can help restrict the available actions that can be performed (e.g., restrict an agent from performing actions such as completely divest shares that may be associated with a local negative trend when there may be a potential for great positive results on a longer term).

The IMT model can receive the input including state features and the reward signals and provide the input via one or more models including the emotive model, the arousal model, and/or the goal model, as described herein, to generate a context that helps the IMT model generate an output (e.g., a sub-goal). Based on the output the IMT model can generate an indication of an action to be performed by the agent. For example, the input can include state features like a current state of a trading market, current state of a particular portfolio, current economic conditions, recent history, or trajectory of identified shares, etc., and a rewards signal such as, for example, a favorable transaction based on an identified action, etc.

Each of the models included in the IMT model can themselves include a hierarchical model that includes a set of models such as an auto-tuning model, a policy model, a policy repertoire model, and/or an auto-tuning repertoire model. The models included in a hierarchical model can each be a learning model (e.g., a reinforcement learning or Q-learning model) used to determine optimal and/or desired parameters or hyperparameters to be used to operate the corresponding model in the IMT model. For example, the hierarchical model associated with the emotive model helps determine hyperparameters and/or policies for the emotive model, the hierarchical model associated with the arousal model helps determine hyperparameters and/or policies for the arousal model, and so on.

Each model included in a hierarchical model (e.g., an auto-tuning model, a policy model, a policy repertoire model, or an auto-tuning repertoire model) can itself include a base model which can be a learning model (e.g., reinforcement learning or Q-learning model) that operates under a learning principle.

Thus, each model in an IMT model can be optimized and/or improved via hierarchical models that are themselves each optimized and/or improved via a base model, such that an action is identified that is optimal and/or desired given the context provided by the emotive model, the arousal model, the goal model, the attentional model, and the affordance models included in the IMT model. The identified action can be provided as an output of the IMT model, which can be provided to the environment model included in the Executive model. The output of the environment model, which is based on the input received from the IMT model, can be used by an action processor included in the executive model to determine the action to be performed by the agent. The action can be, for example, selling or buying an identified set of shares. The action not to perform can be determined by the action processor in the executive model based on the output of the environment model along with input from a working memory controller and a content controller provided indirectly via the active state. The resulting action indicated by the Executive model can then be implemented in the real-world. In turn, the action implemented in the real-world environment can lead to changes in the real-world environment (e.g., by way of a monetary return based on a transaction), which can then be transmitted back to the Executive model via state features and/or reward signals to lead to further computation resulting in the determination of subsequent actions by the agent, as described above.

Embodiments of the systems and/or methods disclosed herein have been tested in a number of real-world products including the following applications:
1. Fintech
   a. Automated equities trading
   b. Position sizing
   c. Portfolio allocation
2. Agtech—Feed and medicinal selection for intensively managed livestock
3. Renewable Energy—Refining event type prediction of utility scale solar plant inverters
4. Meal Planning—Refining recommender results for meal planning and pantry content estimation The agent implemented using an embodiment of the systems and/or methods described herein was found to successfully provide superior results in these applications compared to some known Q-Learning models. Successful models were trained with limited training regimes of 50 to 500 iterations depending on the application. The experimental studies have shown that the systems and methods described herein when incorporated into generating a digital agent improve the agent's performance in real world applications.

As an example, an embodiment of the systems and methods described herein can be implemented in a financial trading application, where digital agents can be used in a stock trading application and can manage live portfolios. A trading model can include an ensemble of agents that learn to trade a security from a collection of securities. From the collection of trading results, the top-performing models are used to build a portfolio. Training of these models can use daily technical data, which includes: Last Trade Price, High, Low, Close, 3v7 Momentum, and Volume with the agent actions include Buy, Sell and Hold. Using the disclosed methods helps generate an improved agent return over 50% and drawdown by over 400%. Further research into the drawdown improvement showed that the impulse control played an important role in preventing errant behavior by 76%.

Embodiments disclosed herein provide an overview of the core elements of a machine learning agnostic architecture possessing an adaptive agent with an unconstrained generative knowledge abstraction capability.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified.

While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
   building a machine learning (ML) model that includes a digital agent configured to navigate a digital environment;
   implementing a navigation of the digital agent over a period of time and following a path within the digital environment, the path including a set of states, each state from the set of states being associated with a value from a set of values, the digital agent upon reaching each state configured to acquire the value associated with that state;
   determining a signal representing an acquisition of values by the digital agent over the period of time;
   computing, based on the signal representing the acquisition of values, an emotive state of the digital agent;
   computing, based on the signal representing the acquisition of values, an arousal state of the digital agent;
   determining a goal for the digital agent based on at least one of the emotive state or the arousal state of the digital agent, the goal configured such that the digital agent achieves an improved overall performance in acquiring cumulative rewards when the digital agent takes actions to navigate towards the goal compared to when the digital agent does not take actions to navigate towards the goal; and
   receive an indication of action taken by the digital agent in the digital environment and implement a real version of the action in a real environment, the digital environment being associated with the real environment.

2. The method of claim 1, wherein the computing the emotive state of the digital agent includes:
   determining a first derivative of the signal representing the acquisition of values, the first derivative representing a rate of acquisition of values; and
   calculating an average measure of the first derivative of the signal representing the acquisition of values, the average measure being indicative of the emotive state of the digital agent.

3. The method of claim 1, wherein the computing the arousal state of the digital agent includes
   determining a second derivative of the signal representing the acquisition of values, the second derivative representing a change in rate of acquisition of values; and
   calculating an average measure of the second derivative of the signal representing the acquisition of values, the average measure being indicative of the arousal state of the digital agent.

4. The method of claim 1, wherein the implementing the navigation of the digital agent includes:
   reaching a first state from the set of states based on taking a first action from a set of actions associated with the digital environment;
   receiving state features associated with the first state upon reaching the first state; and
   determining, based on reasoning using the state features, to perform a second action from the set of actions, the second action configured to navigate the digital agent to a second state from the set of states.

5. The method of claim 4, further comprising:
   calculating an attentional mask defined for the state features associated with the first state, the attentional mask configured, when applied to the state features associated with the first state, to reduce a state space occupied by the state features associated with the first state such that a set of state features associated with an active state space is provided to the digital agent.

6. The method of claim 1, wherein the implementing the navigation of the digital agent includes:
   reaching a first state from the set of states based on taking a first action from a set of actions; and
   calculating an affordance mask defined for the set of actions, the affordance mask configured, when applied to the set of actions, to reduce a number of actions from the set of actions that is available to be performed by the digital agent such that a subset of actions from the set of actions can be performed and remaining actions from the set of actions cannot be performed, the subset of actions being more likely to navigate the digital agent towards the goal than the remaining actions from the set of actions.

7. The method of claim 1, wherein the ML model is implemented using reinforcement learning.

8. The method of claim 1, wherein the ML model is implemented using Q-learning.

9. The method of claim 1, wherein the digital agent is one of a plurality of digital agents and the ML model is from a plurality of ML models, each ML model from the plurality of ML models configured to at least one of define or implement a navigation of at least one digital agent from the plurality of digital agents.

10. The method of claim 1, wherein the ML model is from a plurality of ML models included in an ML model architecture, each ML model from the plurality of ML models configured to operate at a hierarchical level from a plurality of hierarchical levels of the ML model architecture such that a first set of ML models from the plurality of ML models is operable at a first hierarchical level in the ML model architecture and a second set of ML models from the plurality of ML models, different than the first set of ML models, is operable at a second hierarchical level different than the first hierarchical level.

11. The method of claim 1, wherein the ML model is a collection of ML models including:
a first ML model from the collection of ML models, the first ML model configured to compute the emotive state of the digital agent; and
a second ML model from the collection of ML models different than the first ML model, the second ML model configured to compute the arousal state of the digital agent.

12. The method of claim 11, wherein the first ML model includes a first set of ML models and the second ML model includes a second set of ML models, the first ML model and the second ML model being configured to be operable at a first hierarchical level of an ML model architecture, and the first set of ML models and the second set of ML models configured to be operable at a second hierarchical level of the ML model architecture, the second hierarchical level being lower than the first hierarchical level.

13. The method of claim 11, wherein the collection of ML models includes at least one of an auto-tuning model configured to auto-tune one or more hyperparameters associated with at least one of the first ML model or the second ML model, and a policy model configured to provide one or more policies associated with the at least one of the first ML model or the second ML model.

14. An apparatus, comprising:
a memory; and
a hardware processor operatively coupled to the memory, the hardware processor configured to:
implement, using a stack of ML models according to a hierarchical ML model architecture, a navigation of a digital agent in a digital environment towards a predefined goal over a period of time and following a path, the path including a set of states, each state from the set of states being associated with a value from a set of values, the digital agent configured to, upon reaching each state, acquire the value associated with that state and from the set of values;
monitor a signal representing an acquisition of values from the set of values over the period of time and by the digital agent;
calculate a sub-goal based on a rate of acquisition of values and using a first ML model from the stack of ML models, the sub-goal configured to adjust the digital agent's behavior to finding a balance between exploration for unknown values and exploitation of known values, the first ML model being at a first hierarchical level in the hierarchical ML model architecture; and
generating an agent action, using a second ML model from the stack of ML models different than the first ML model and at a second hierarchical level in the hierarchical ML model architecture different than the first hierarchical level, and based on the sub-goal, the sub-goal being configured such that the digital agent achieves an improved overall performance in acquiring cumulative rewards when the digital agent performs actions to navigate towards the sub-goal compared to when the digital agent does not perform actions to navigate towards the sub-goal.

15. The apparatus of claim 14, wherein the hardware processor is further configured to:
compute at least one of an emotive state of the digital agent or an arousal state of the digital agent based on the signal representing the acquisition of values, the sub-goal being calculated based on the at least one of the emotive state of the digital agent or the arousal state of the digital agent.

16. The apparatus of claim 15, wherein the hardware processor is further configured to:
compute the at least one of the emotive state of the digital agent or the arousal state of the digital agent by calculating a first derivative of the signal representing the acquisition of values or a second derivative of the signal representing the acquisition of values, respectively.

17. The apparatus of claim 14, wherein the hardware processor is further configured to:
induce the digital agent to reach a first state from the set of states based on performing a first action;
receive state features associated with the first state upon reaching the first state; and
determine, based on reasoning using the state features, a second action from a set of actions to perform, the second action configured to navigate the digital agent to a second state from the set of states, a likelihood of navigating the digital agent towards the sub-goal when the digital agent reached the second state being greater than when the digital agent reached the first state.

18. The apparatus of claim 17, wherein the hardware processor is further configured to:
calculate an attentional mask defined for the state features associated with the first state, the attentional mask configured, when applied to the state features associated with the first state, to reduce a state space occupied by the state features associated with the first state such that only a set of state features associated with an active state space is provided to the digital agent.

19. The apparatus of claim 17, wherein the first action and the second action are included in the set of actions, the hardware processor further configured to:
calculate an affordance mask defined for the set of actions, the affordance mask configured, when applied to the set of actions, to reduce a number of actions from the set of actions that is available to be taken by the digital agent such that a subset of actions from the set of actions can be performed and remaining actions from the set of actions cannot be performed, the subset of actions being more likely to navigate the digital agent towards the sub-goal than the remaining actions from the set of actions.

20. A non-transitory processor-readable medium storing code representing instructions to be executed by a processor, the instructions comprising code to cause the processor to:

receive a signal representing an acquisition of values by a digital agent navigating a digital environment, the digital agent being directed to navigate towards a predefined goal;

calculate an emotive state of the digital agent based on the signal representing the acquisition of values by the digital agent;

calculate an arousal state of the digital agent based on the signal representing the acquisition of values by the digital agent;

generate a sub-goal, based on the emotive state and the arousal state of the digital agent, the sub-goal configured to at least one of direct the digital agent toward the predefined goal or increase a cumulative reward acquired by the digital agent;

receive an indication of action performed by the digital agent in the digital environment, based on the sub-goal; and implement a real version of the action in a real environment, the digital environment being associated with the real environment.

21. The non-transitory processor-readable medium of claim 20, wherein the instructions comprising code to cause the processor to receive the indication of action performed by the digital agent further includes instructions comprising code to cause the processor to implement the action in the digital environment using an ML model, the ML model being implemented using at least one of reinforcement learning or Q-learning.

22. The non-transitory processor-readable medium of claim 20, wherein the real environment includes at least one of a financial investment environment, agricultural livestock management environment, renewable energy environment, meal planning environment, or inventory management environment.

* * * * *